US010055064B2

(12) United States Patent
Tokutake

(10) Patent No.: US 10,055,064 B2
(45) Date of Patent: Aug. 21, 2018

(54) CONTROLLING MULTIPLE DEVICES WITH A WEARABLE INPUT DEVICE

(71) Applicant: Sony Corporation, Tokyo (JP)

(72) Inventor: Kenji Tokutake, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 98 days.

(21) Appl. No.: 14/526,625

(22) Filed: Oct. 29, 2014

(65) Prior Publication Data

US 2016/0124579 A1     May 5, 2016

(51) Int. Cl.
| | |
|---|---|
| *G06F 3/042* | (2006.01) |
| *G06F 3/01* | (2006.01) |
| *G06F 3/0481* | (2013.01) |
| *G06F 3/0486* | (2013.01) |
| *G06F 3/0346* | (2013.01) |

(52) U.S. Cl.
CPC ............ *G06F 3/0425* (2013.01); *G06F 3/017* (2013.01); *G06F 3/0346* (2013.01); *G06F 3/0481* (2013.01); *G06F 3/0486* (2013.01); *G06F 2203/04803* (2013.01)

(58) Field of Classification Search
CPC ........ G06F 3/014; G06F 3/017; G06F 3/1454; G06F 2203/04803; G06F 3/0346; G06F 3/04815; G06F 3/04842; G06F 2200/1637; G09G 5/14; G09G 2370/20
See application file for complete search history.

(56) References Cited

U.S. PATENT DOCUMENTS

| | | | | |
|---|---|---|---|---|
| 9,069,385 | B1* | 6/2015 | Lynch | G06F 3/017 |
| 2001/0002211 | A1* | 5/2001 | Lee | H04M 1/6066 |
| | | | | 379/414 |
| 2003/0234823 | A1* | 12/2003 | Sato | G06F 3/013 |
| | | | | 715/848 |
| 2008/0036647 | A1* | 2/2008 | Jung | G01S 11/06 |
| | | | | 342/118 |

(Continued)

FOREIGN PATENT DOCUMENTS

JP     2010-231736     10/2010

*Primary Examiner* — Benjamin C Lee
*Assistant Examiner* — Dong Hui Liang
(74) *Attorney, Agent, or Firm* — Xsensus, LLP

(57) ABSTRACT

Embodiments include an electronic input system, which has a wearable input device having an accelerometer and circuitry configured for an operation detection mechanism and an input communication mechanism. The operation detection mechanism acquires acceleration data from the accelerometer to detect an input event. The electronic input system also has a first electronic device having circuitry for a first communication mechanism, a first event analyzer, a screen display, and a first data communication mechanism. The electronic input system also has a second electronic device having circuitry configured for a second communication mechanism, a second event analyzer, a second data communication mechanism, a screen combining mechanism, and a screen display. Embodiments also include a method of communicating an event between an input device and one or more electronic portable devices, such as the first electronic device and the second electronic device.

23 Claims, 35 Drawing Sheets

(56) References Cited

U.S. PATENT DOCUMENTS

| | | | |
|---|---|---|---|
| 2008/0152263 A1* | 6/2008 | Harrison | G06F 1/1626 |
| | | | 382/313 |
| 2009/0153475 A1* | 6/2009 | Kerr | H04N 5/4403 |
| | | | 345/157 |
| 2010/0138780 A1 | 6/2010 | Marano et al. | |
| 2010/0188579 A1* | 7/2010 | Friedman | H04N 5/45 |
| | | | 348/565 |
| 2011/0175822 A1* | 7/2011 | Poon | G06F 3/04842 |
| | | | 345/173 |
| 2011/0199389 A1 | 8/2011 | Lu et al. | |
| 2011/0283334 A1 | 11/2011 | Choi et al. | |
| 2012/0169482 A1* | 7/2012 | Chen | G08C 17/02 |
| | | | 340/12.52 |
| 2013/0278484 A1 | 10/2013 | Hwang et al. | |
| 2014/0009394 A1* | 1/2014 | Lee | H04N 5/4403 |
| | | | 345/157 |
| 2014/0176809 A1* | 6/2014 | Chen | H04N 21/42222 |
| | | | 348/734 |
| 2014/0267024 A1 | 9/2014 | Keller et al. | |

\* cited by examiner

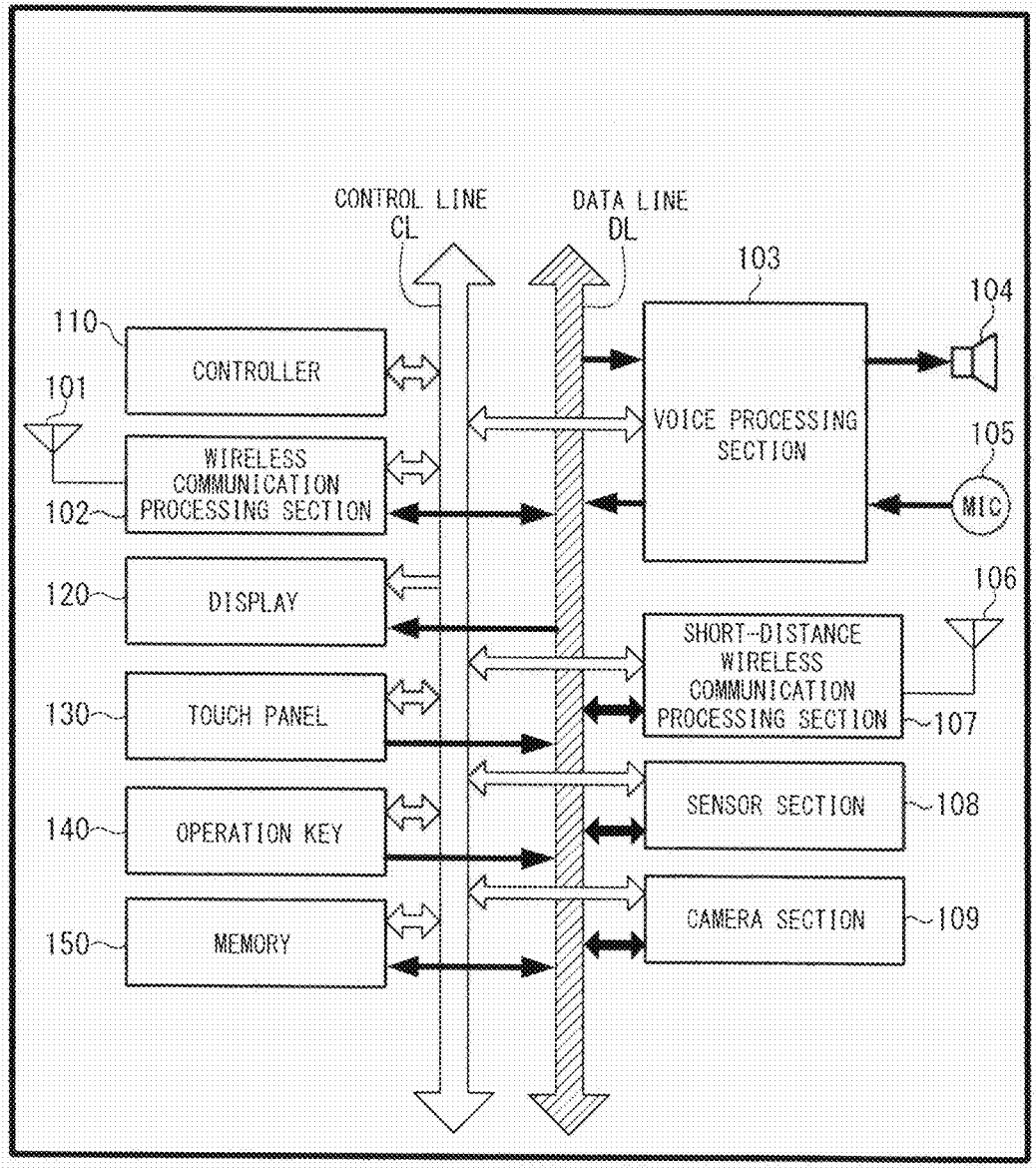

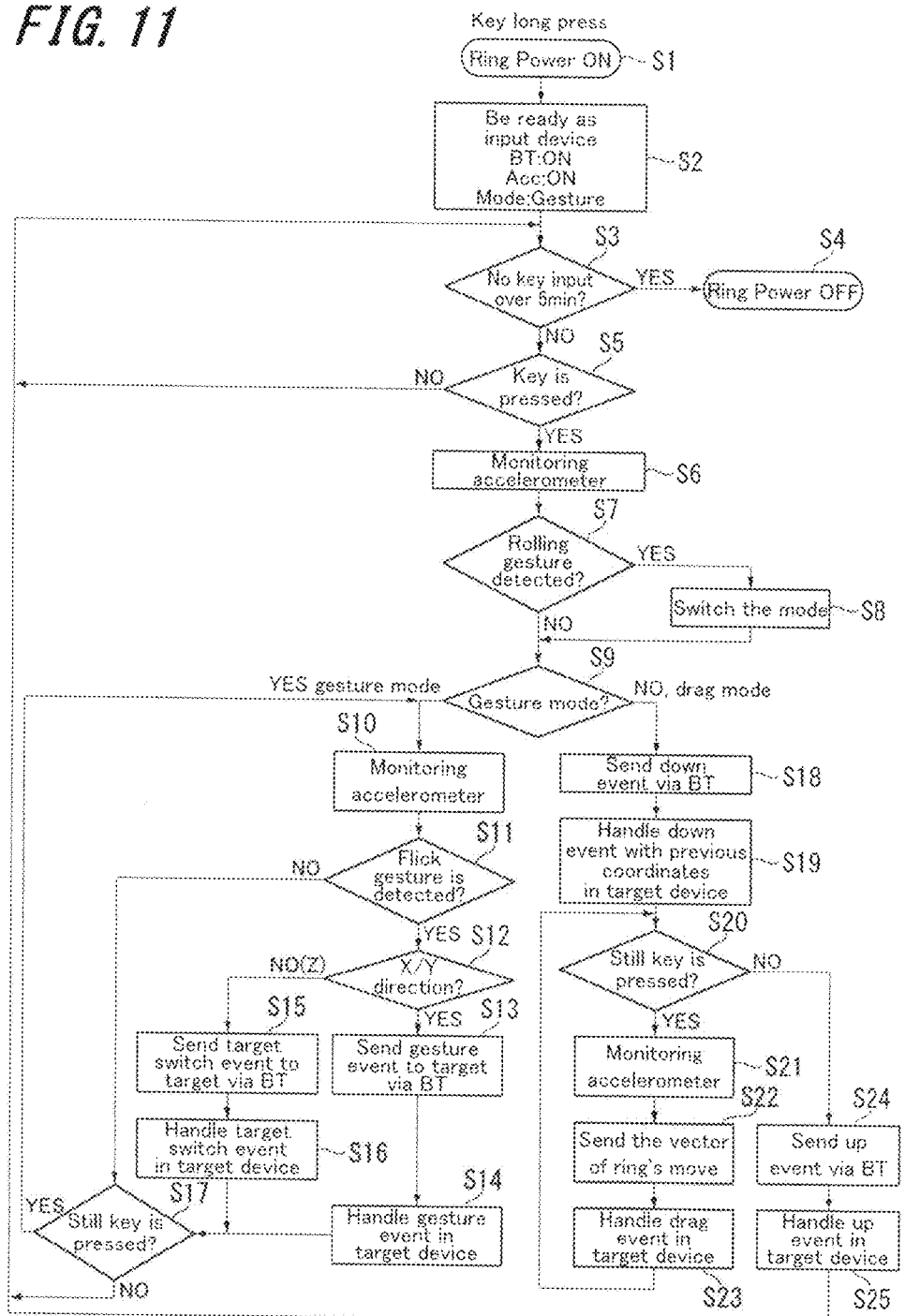

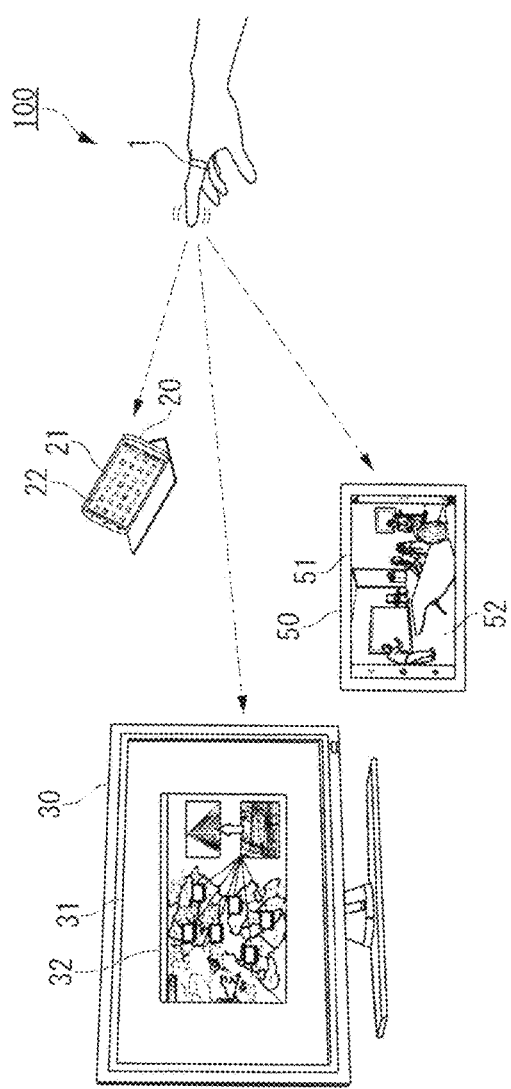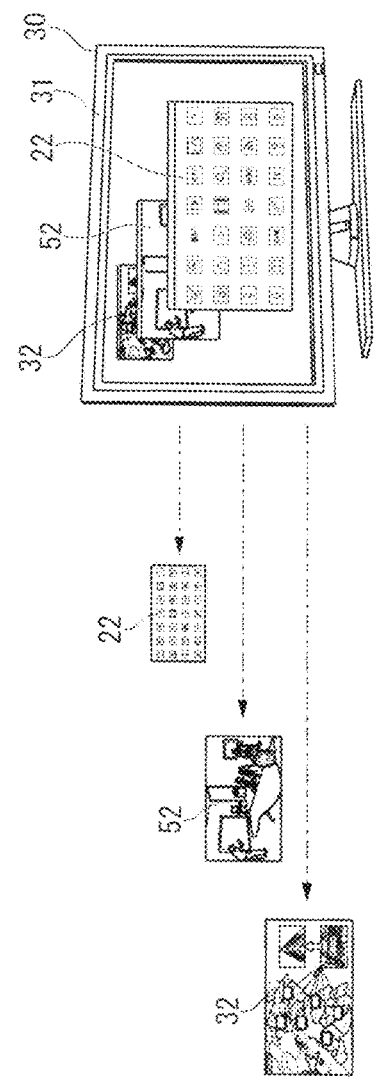
FIG. 26A
FIG. 26B

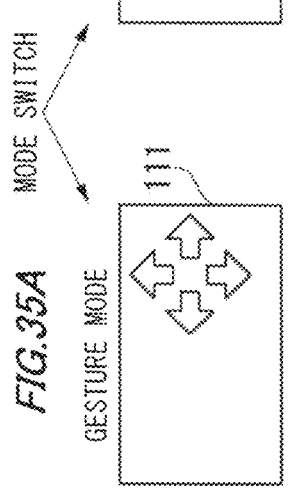
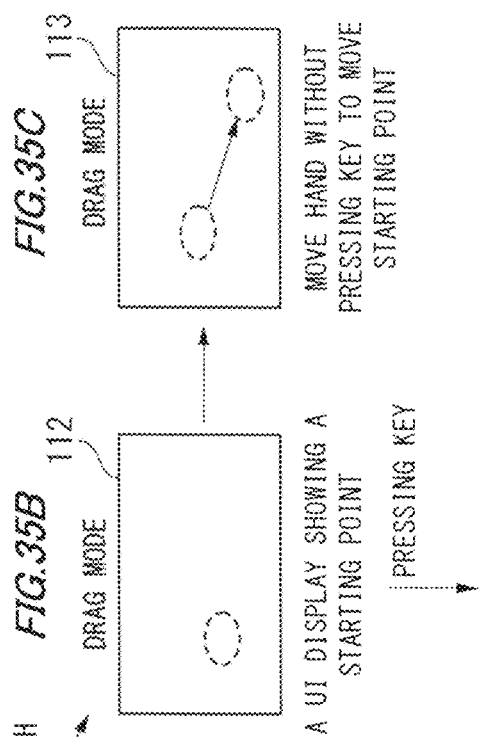
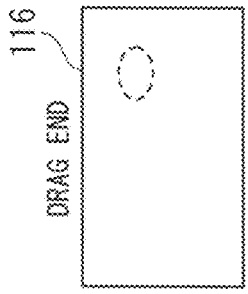
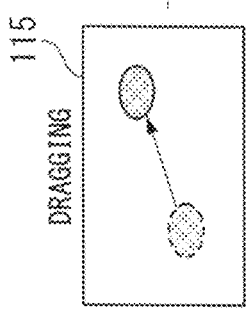
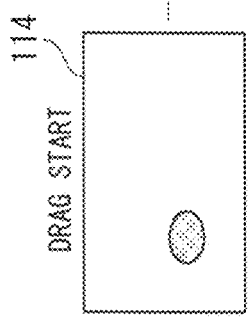

CONTROLLING MULTIPLE DEVICES WITH A WEARABLE INPUT DEVICE

BACKGROUND OF THE INVENTION

Field of the Invention

Systems and methods for operating a plurality of devices are described. In particular, a wearable input device used to control multiple devices is described.

Description of the Related Art

Recent developments have provided systems and methods in which an input gesture can be used to direct or control one or more computing devices with a camera device. However, there are problems associated with the use of a camera device, such as power consumption, a size of the camera device, and input precision. In addition, input gestures directed to a mobile device cannot be made full-scale. Also, a camera input gesture system cannot utilize a triaxial type of accelerometer.

SUMMARY OF THE INVENTION

Embodiments include an electronic input system, which includes a wearable input device having an accelerometer and circuitry configured for an operation detection mechanism and an input communication mechanism, wherein the operation detection mechanism acquires acceleration data from the accelerometer to detect an input event. The electronic input system also includes a first electronic device having circuitry for a first communication mechanism, a first event analyzer, a screen display, and a first data communication mechanism. The electronic input system also includes a second electronic device having circuitry configured for a second communication mechanism, a second event analyzer, a second data communication mechanism, a screen combining mechanism, and a screen display. The input communication mechanism, the first communication mechanism, and the second communication mechanism have circuitry configured to send notification of the input event of the wearable input device. The first event analyzer and the second event analyzer have circuitry configured to analyze the input event detected by the wearable input device. The first data communication mechanism and the second data communication mechanism have circuitry configured to send and receive screen data to and from one another. Circuitry of the wearable input device is configured to wirelessly send operation content from the wearable input device to a screen-to-be-controlled of the first electronic device or the second electronic device as a switching event, via a depth direction movement of the wearable input device. Circuitry of the screen combining mechanism is configured to combine a screen of the second electronic device with a screen obtained from screen data received from the first electronic device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1B illustrates an exemplary electronic device according to one embodiment;

FIG. 11 is a flow diagram of an exemplary input process according to one embodiment;

FIGS. 26A-26B each illustrate a multiple terminal arrangement and a user interface configuration according to one embodiment;

FIGS. 35A-35F illustrate exemplary user interface displays for different modes according to one embodiment.

Referring now to the drawings, wherein like reference numerals designate identical or corresponding parts throughout the several views.

DETAILED DESCRIPTION OF THE PREFERRED EMBODIMENTS

Embodiments herein describe input systems and methods which control object terminals by using an input device, such as a ring-type input device or other wearable type of structure. The input device is small and is equipped with 3-D inputting functions.

Figure 1A:
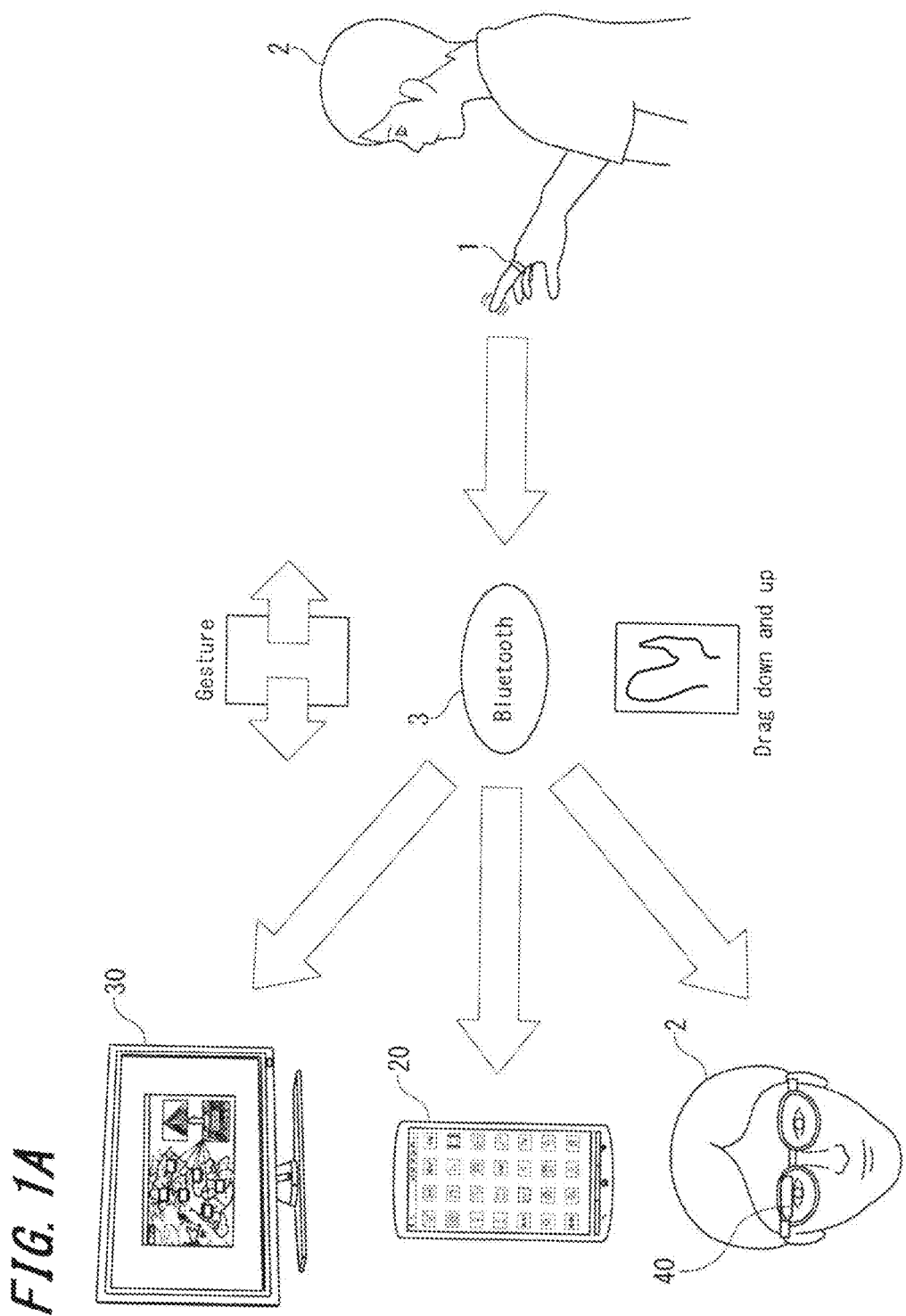
FIG. 1A is an overview of an input system according to one embodiment.

FIG. 1A illustrates an overview of an exemplary input system. A user 2 operates a wearable input device 1, such as a ring input device to direct and control terminal devices. Another embodiment of an input device 1 is a small apparatus held in the palm of a user's hand. The terminal devices include, but are not limited to a portable terminal 20, a non-portable TV terminal 30, and portable spectacles or glasses 40. Motion information, such as acceleration data of the wearable input device 1 is transmitted to any one of terminals 20, 30, or 40 via Bluetooth 3. Input operations include, but are not limited to a gesture and a drag and drop input. The input operation is received by the target side of the terminals 20, 30, and 40.

FIG. 1B is a block diagram illustrating an exemplary electronic device according to certain embodiments of the present disclosure. In certain embodiments, electronic device 100 may be a smartphone. However, the skilled artisan will appreciate that the features described herein may be adapted to be implemented on other devices (e.g., a laptop, a tablet, a server, an e-reader, a camera, a navigation device, etc.). The exemplary electronic device 100 of FIG. 1B includes a controller 110, a wireless communication processor 102 connected to an antenna 101, a speaker 104, a microphone 105, and a voice processor 103.

The controller 110 may include one or more Central Processing Units (CPUs), and may control each element in the electronic device 100 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network, or on a non-transitory computer readable medium.

The memory 150 may include, e.g., Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto.

The electronic device 100 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the electronic device 100 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio, and converts the detected audio into an audio signal. The audio signal may then be output to the voice processor 103 for further processing. The voice processor 103 demodulates and/or decodes the audio data read from the memory 150, or audio data received by the wireless communication processor 102 and/or a short-distance wireless communication processor 107. Additionally, the voice processor 103 may decode audio signals obtained by the microphone 105.

The exemplary electronic device of FIG. 1B may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons, which may be used for control of the electronic device 100. The display 120 may additionally display a GUI such that a user may control aspects of the electronic device 100 and/or other devices. Further, the display 120 may display characters and images received by the electronic device 100 and/or stored in the memory 150 or accessed from an external device on a network. For example, the electronic device 100 may access a network such as the Internet, and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus, or the like, is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

In certain aspects of the present disclosure, the touch panel 130 may be disposed adjacent to the display 120 (e.g., laminated), or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger, is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g., in response to a detection of a touch operation, in response to a query from another element, based on timed data exchange, etc.

The touch panel 130 and the display 120 may be surrounded by a protective casing, which may also enclose the other elements included in the electronic device 100. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the electronic device 100, based on the detected finger position. For example, the touch panel 130 sensors may detect a plurality of fingers on the left side of the electronic device 100 (e.g., on an edge of the display 120 or on the protective casing), and detect a single finger on the right side of the electronic device 100. In this exemplary scenario, the controller 110 may determine that the user is holding the electronic device 100 with his/her right hand because the detected grip pattern corresponds to an expected pattern when the electronic device 100 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the electronic device 100 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The electronic device 100 may include a motion sensor 108. The motion sensor 108 may detect features of motion (i.e., one or more movements) of the electronic device 100. For example, the motion sensor 108 may include an accelerometer, a gyroscope, a geomagnetic sensor, a geo-location sensor, etc., or a combination thereof, to detect motion of the electronic device 100. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the electronic device 100 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal.

The electronic device 100 may include a camera section 109, which includes a lens and shutter for capturing photographs of the surroundings around the electronic device 100. The images of the captured photographs can be displayed on the display panel 120. A memory section saves the captured photographs. The memory section may reside within the camera section 109, or it may be part of the memory 150.

Figure 2:
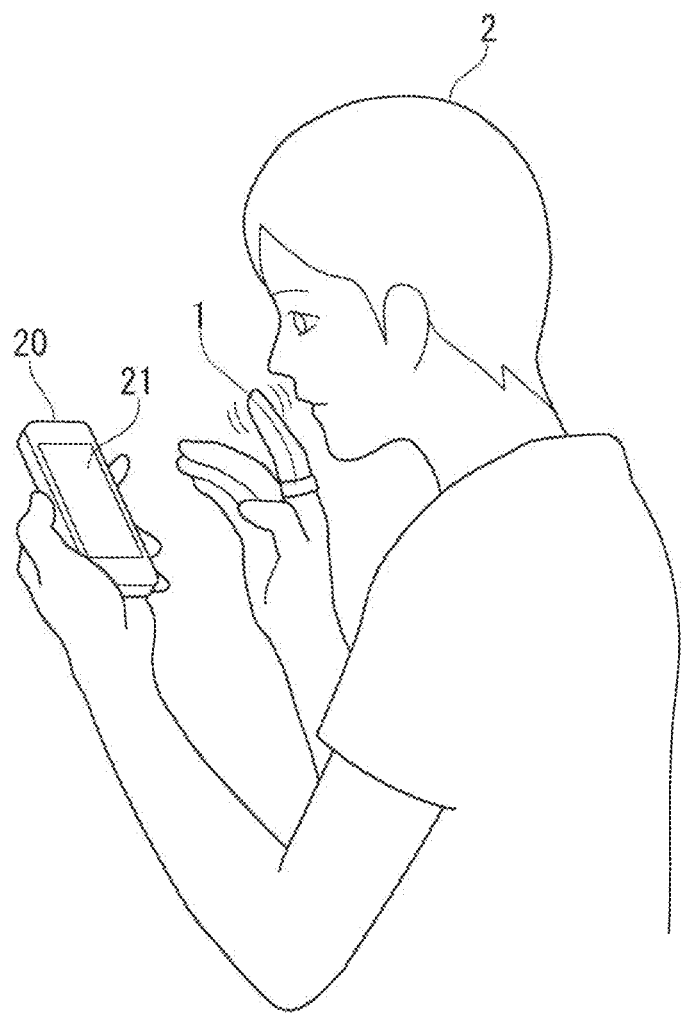
FIG. 2 illustrates a user with a portable terminal device according to one embodiment.

FIG. 2 illustrates a first embodiment of utilizing an input system, such as the input system illustrated in FIG. 1A. The user 2 has a portable terminal 20 in a left hand, and inputs instructions by operating a ring-type wearable input device 1, which is on the right hand of the user 2. The portable terminal 20 is an example of the electronic device 100 described above with reference to FIG. 1B. Even though a right finger with the input device 1 does not touch the portable terminal 20, the portable terminal 20 can still be operated. When the user 2 performs an input operation, results are displayed on a screen display 21 of the portable terminal 20.

Figure 3:
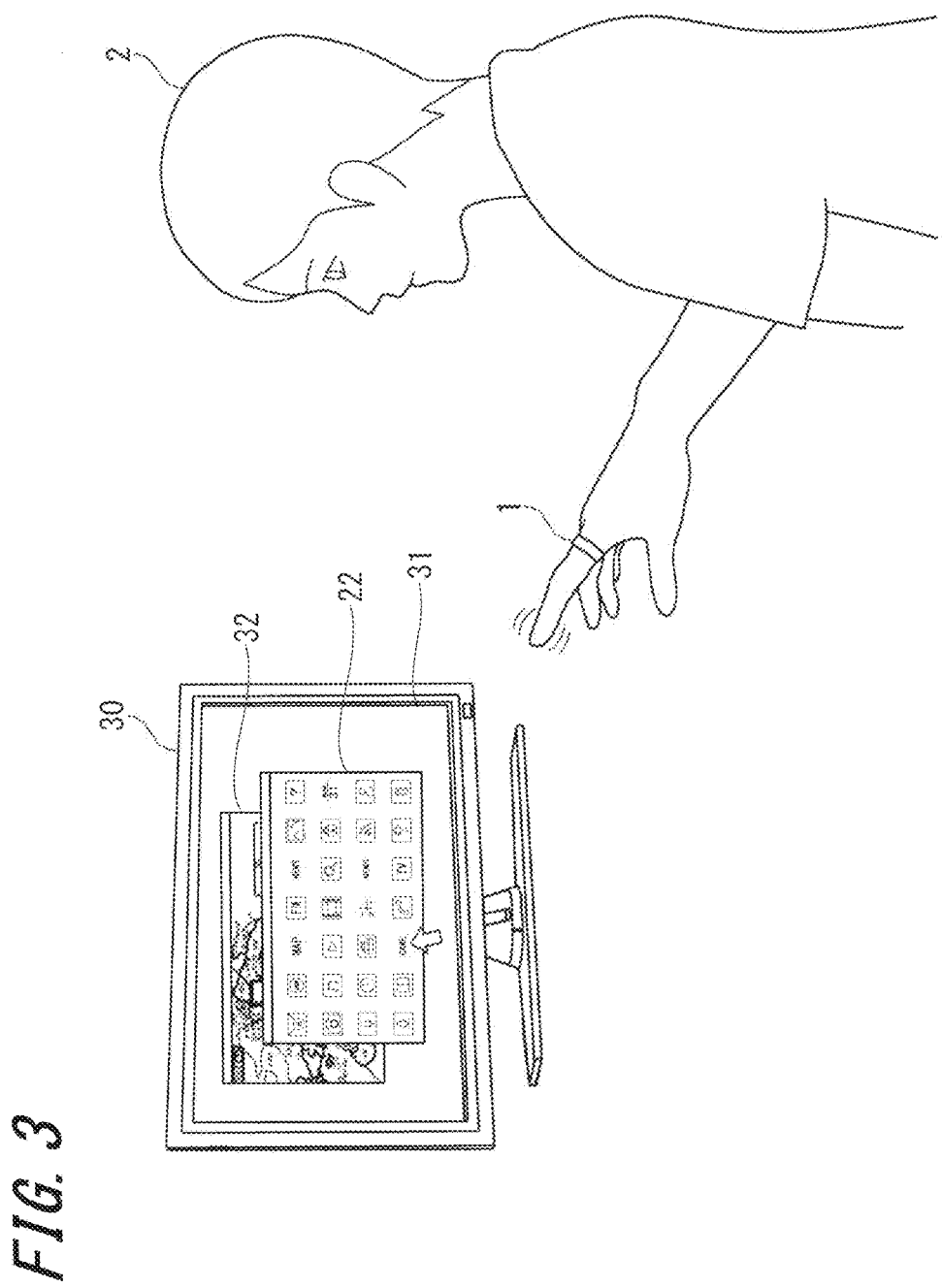
FIGS. 3-4 each illustrate a user with a wearable input device according to one embodiment.

FIG. 3 illustrates a second embodiment of utilizing an input system, such as the input system illustrated in FIG. 1A. The user 2 operates the wearable input device 1 as a cursor pointer to drag and drop the displayed image of the portable terminal 20 to the screen of TV terminal 30. The displayed screen 31 of the TV terminal 30 displays the original screen 32 of the TV terminal 30 and also displays the screen 22 from the portable terminal 20. This was accomplished without touching either the portable terminal 20 or the TV terminal 30, and without the aid of a camera device.

Figure 4:
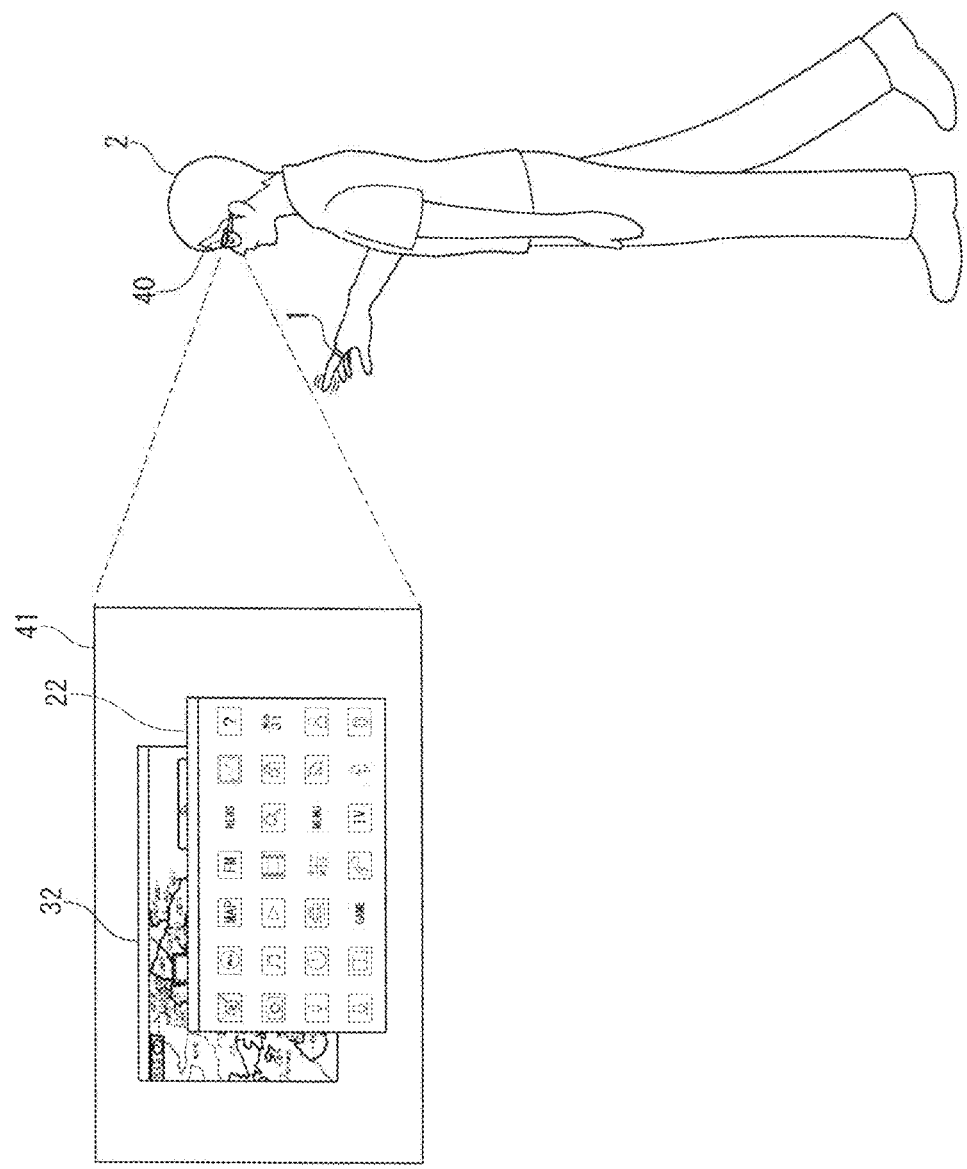

FIG. 4 illustrates a third embodiment of utilizing an input system, such as the input system illustrated in FIG. 1A. FIG. 4 illustrates a displayed screen 41 of the spectacles terminal 40. The displayed screen 41 displays screen 32 of the TV terminal 30 in the background and screen 22 of the portable terminal 20 in the foreground. The screens 22 and 32 are manipulated by the input device 1 on the hand or finger of the user 2.

Figure 5:
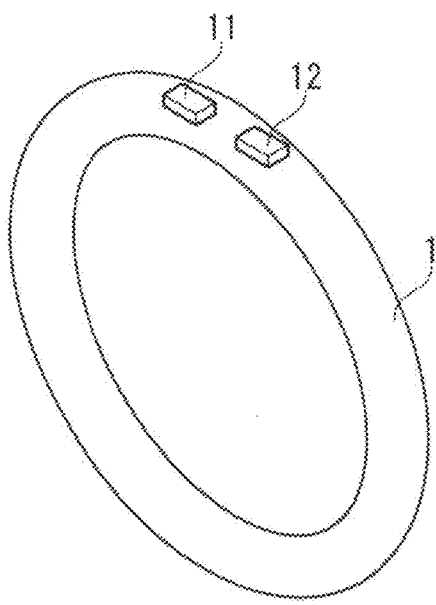
FIGS. 5-6 each illustrate a portable device according to one embodiment.

FIG. 5 illustrates an input device 1 in the form of a ring-type input device, which is annular-ring shaped and has a through-hole in the center. The user 2 wears the ring-type input device 1 on an arbitrary finger of the left hand or the right hand. The input device 1 has a power supply key 11 and an operation key 12 at a main body of the ring-type input device 1. FIG. 5 illustrates two separate keys. However, a single key could be used for both functions of a power supply and operations. The user 2 can execute various inputs, such as a gesture, a flick, or a drag and drop maneuver by performing a linear motion or a rotary motion while pressing the operation key 12. In an embodiment, when the power supply key 11 is pressed for a predetermined amount of time, such as 5 seconds or more, the power supply can be switched on and off.

Figure 6:
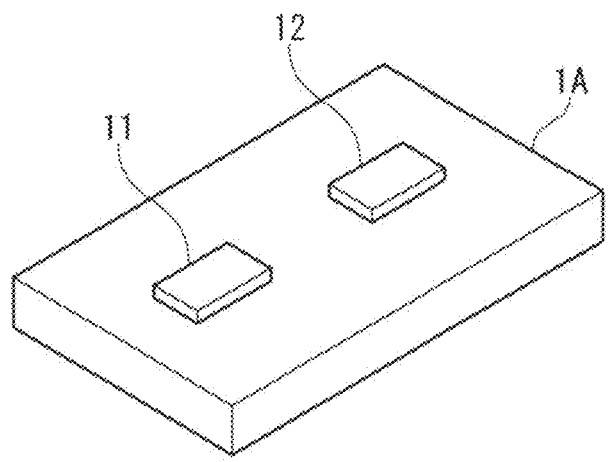

FIG. 6 illustrates an input device 1A, which is a small apparatus configured to be held in the palm of a hand of the user 2. It includes a power supply key 11 and an operation key 12, with functions as described above for the ring-type input device 1. FIG. 6 illustrates a rectangular-shaped input device 1A. However, other shapes are contemplated by embodiments described herein, such as a round or oval shaped input device. In addition, a shape specific to the left hand and specific to the right hand can be used. A wristband-type of input device could also be used with embodiments described herein.

Figure 7:
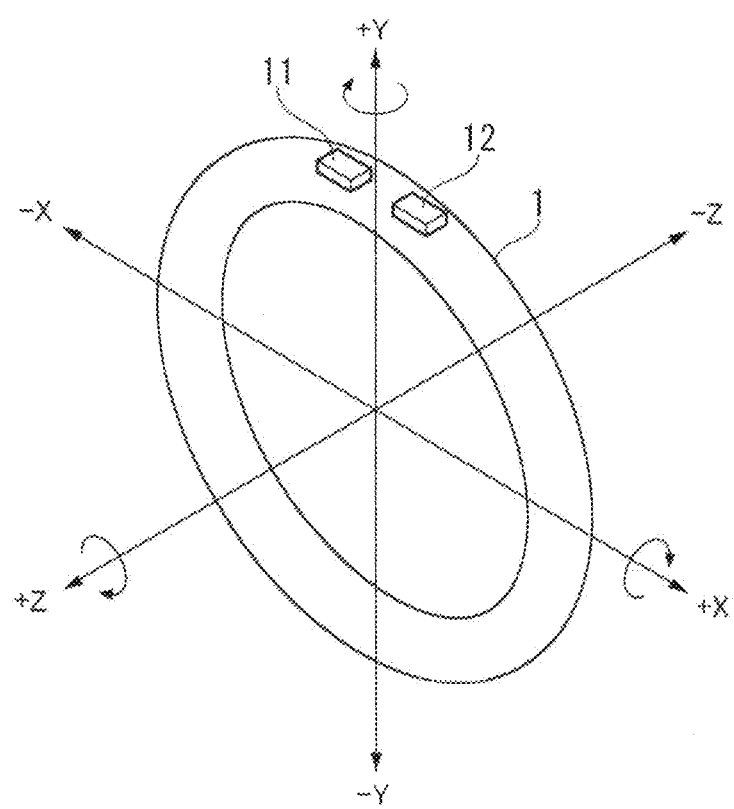
FIG. 7 illustrates control keys of a ring portable device according to one embodiment.

FIG. 7 illustrates the axes of rotation in which input from a ring-type input device 1 can be forwarded to one or more receiving terminals. A y-axis is illustrated in the vertical plane of the page, and two transverse planes perpendicular to the vertical plane are illustrated along an x-axis and a z-axis. The z-axis is along an axial direction of the finger when the finger with the input device 1 is extended and pointed towards one of the receiving terminals. A power supply key 11 and an operation key 12 are also illustrated.

The input device 1 also includes a triaxial-type accelerometer and a triaxial-type gyroscope within the input device 1. The input device 1 can detect a directional action to any of the three axes with the built-in accelerometer. In addition, the input device 1 can detect rotation about each of the three axes with a built-in gyroscope. This provides motion detection in a total of six axes, i.e. three directional or linear axes and three rotational axes. In addition to a ring-type input device 1 illustrated in FIG. 7, a triaxial-type accelerometer and a triaxial-type gyroscope can be configured with a handheld input device, such as the input devices described above with reference to FIG. 6.

Figure 8:
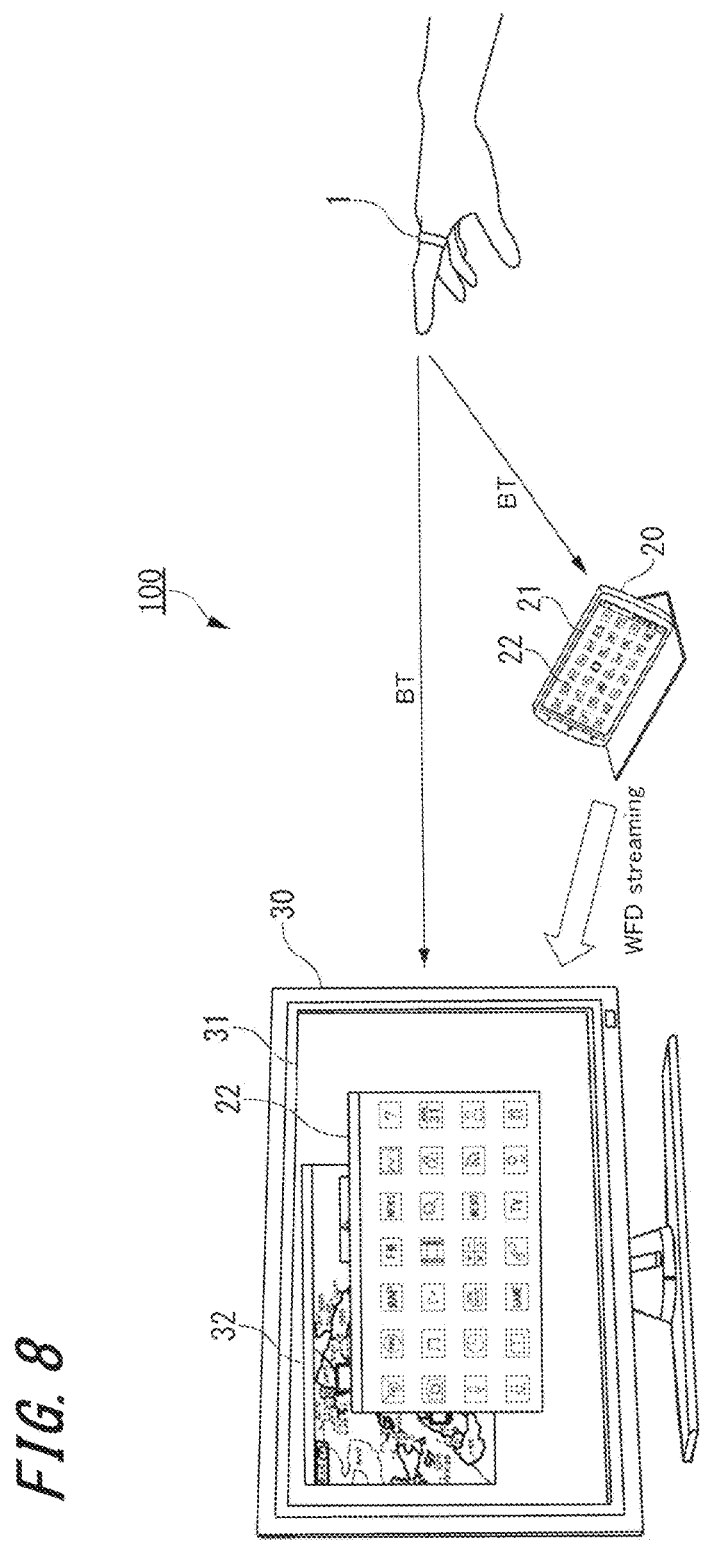
FIGS. 8-9 each illustrate an input system according to one embodiment.

FIG. 8 illustrates an input system 100 according to one embodiment. Multiple terminal screens are combined into one screen by combining a screen from each terminal onto a destination terminal. The screens are forwarded or transferred to a destination terminal using a multipoint function, in conjunction with Bluetooth communications. FIG. 8 illustrates an input device 1 on the finger of a user. A portable terminal 20 receives an operation input from the input device 1, via Bluetooth, wherein the screen 22 of portable terminal 20 is forwarded from the screen display 21 to the screen display 31 of TV terminal 30. In addition, file sharing and an output of a media stream can occur from the portable terminal 20 to the TV terminal 30, via Wi-Fi. The user operates the input device 1 by utilizing a combination of directional and rotational input gestures. As an example, given for illustrative purposes only, the user can point the finger containing the input device 1 towards the portable terminal 20 while holding down the operation key 12. This may be followed by a flicking gesture away from the portable terminal 20, and a second pointing gesture towards the TV terminal 30. The operation key 12 may be continuously held down for this series of actions, or the operation key 12 may be pressed multiple times for each individual action. As a result, screen 32 of the TV terminal 30 is displayed on the screen display 31 in the background, and screen 22 of the portable terminal 20 is displayed in the foreground.

Figure 9:
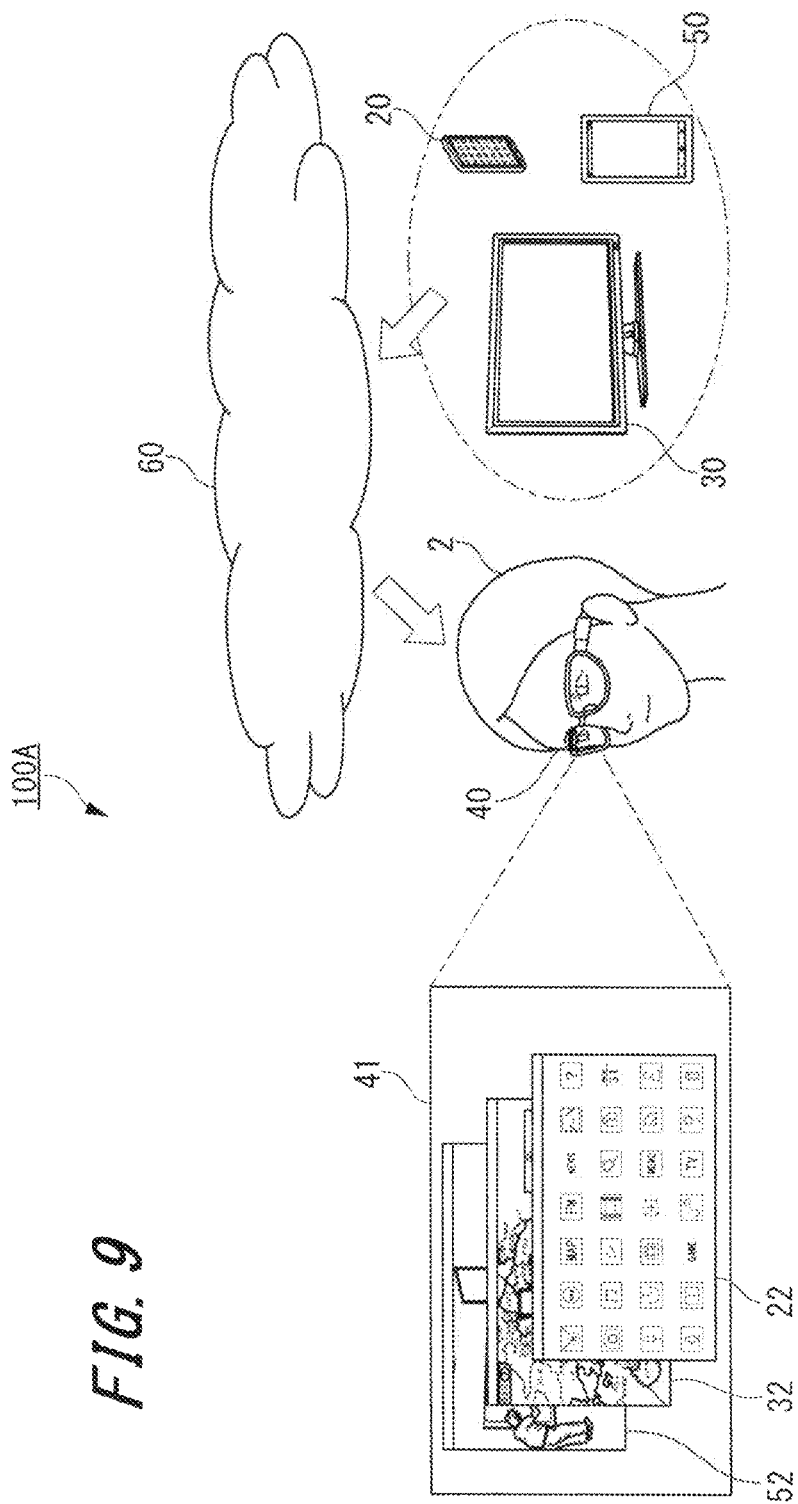

FIG. 9 illustrates an input system 100A in which input actions are remotely controlled. In FIG. 9, the screens displayed on the portable terminal 20, a table-type terminal 50, and the TV terminal 30 are transmitted to an input apparatus worn on glasses 40 of a user 2, via a cloud structure 60. Screens 22, 32, and 52 are displayed on a screen display 41 of the glasses 40. Input system 100A displays screen content from all three terminals as one screen, which is controlled by 3-D input and cloud utilization. As an example, given for illustrative purposes only, the screens displayed on the portable terminal 20, the tablet-type terminal 50, and the TV terminal 30 are transmitted to the glasses 40 worn by the user 2, via a cloud structure 60. The three screens are displayed on a single screen display 41. In addition, an active screen is selected from the three screens by supplying an input signal in the z-axis direction of the input device 1 to the glasses 40, via the cloud 60. As a result, a control object terminal is designated and operated by the input device 1.

Figure 10:
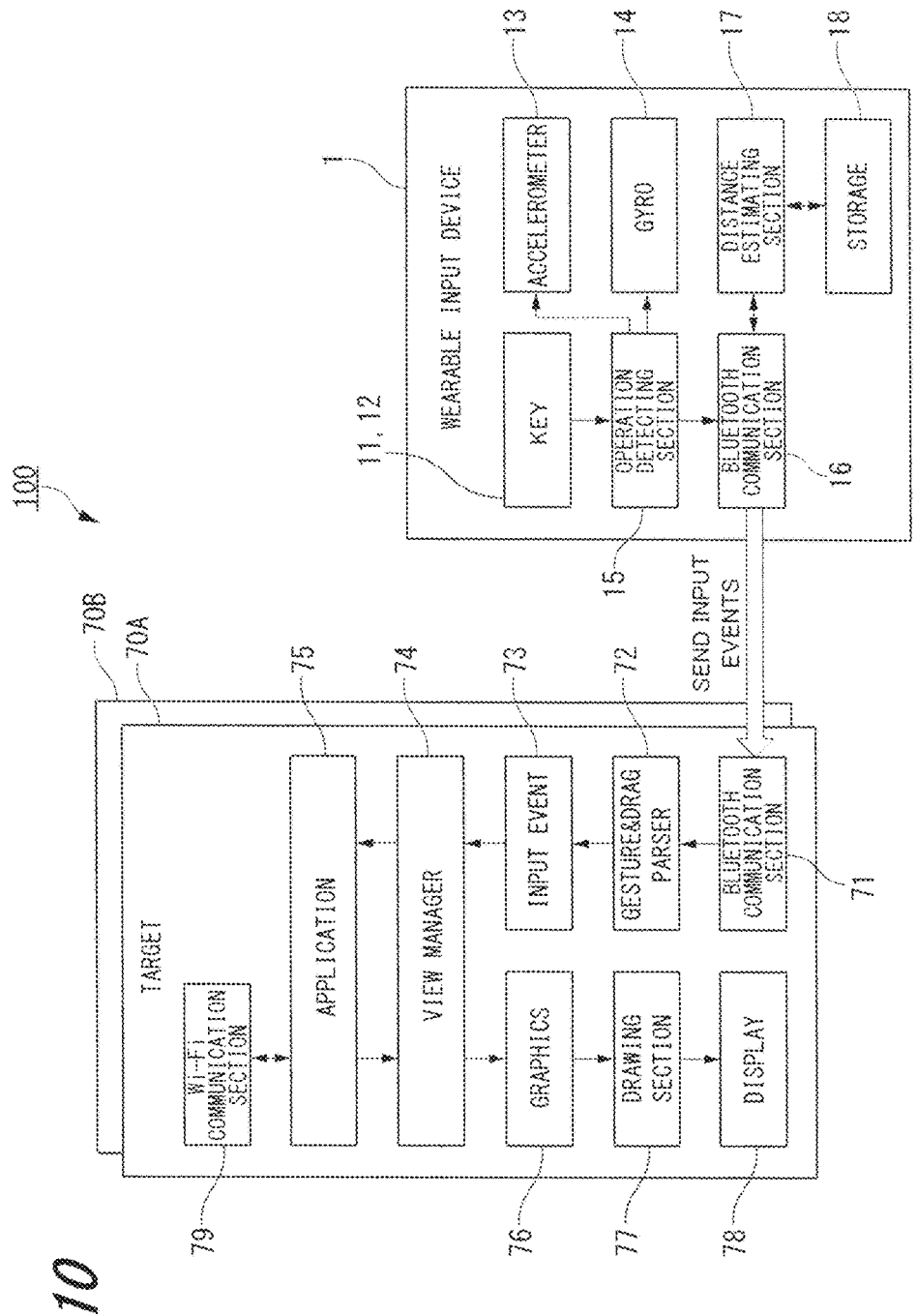
FIG. 10 is a block diagram of an exemplary input system according to one embodiment.

FIG. 10 is a block diagram of an exemplary structure of an input system 100. Bluetooth communication can be used between a wearable input device 1, a first terminal device target 70A, and a second terminal device target 70B. A target is a terminal that can become a control object of the wearable input device 1. With reference back to FIG. 9, the target could be one of the portable terminal 20, the glasses 40, the tablet-type terminal 50, or the TV terminal 30.

The wearable input device 1 could be a ring-type input device or a handheld device. The wearable input device 1 has a power key 11 and a control key 12, which could be the same structural key or two separately-controlled keys. The wearable input device 1 also includes an accelerometer 13, a gyroscope 14, an operation detection mechanism 15, and a Bluetooth communication mechanism 16 as hardware components. The operation detection mechanism 15 acquires data, which is outputted by the accelerometer 13 and the gyroscope 14, and detects an operation performed by a user as an input event.

The wearable input device 1 changes an input mode by detection of a motion from the user. Two types of input are a gesture and a drag. When the user presses the operation key 12, the hand having the wearable input device 1 is moved. This action sends motion information, such as acceleration data to target 70A and/or 70B. When the user does not press the operation key 12, the input device 1 does not detect input from the user.

For Bluetooth communication, the relationship between a signal strength or field intensity of Bluetooth and distance between a signal source and receptor is utilized. A distance estimation between terminals is performed based on the signal strength. After generating a communication path between terminals, a signal strength is corrected to stabilize the communication. The wearable input device 1 includes a distance estimation mechanism 17 and a storage mechanism 18. The distance estimation mechanism 17 estimates a distance from the input device 1 to a connecting point terminal based on the strength of a received signal. The distance estimation mechanism 17 can change the strength of a radio signal transmitted from the Bluetooth communication mechanism 16. The storage mechanism 18 can include a non-volatile storage component, which has data for a relationship between a signal strength of Bluetooth and a distance between the input device 1 and a connecting terminal contained in a table.

Target 70A in FIG. 10 is equipped with a Bluetooth communication mechanism 71, a gesture/drag analysis mechanism 72, an input event transmission mechanism 73, a view manager mechanism 74, an application mechanism 75, a graphics mechanism 76, a drawing mechanism 77, a display mechanism 78, and a Wi-Fi communication mechanism 79 as hardware components. Execution of the application mechanism 75 is achieved when a central processing unit or a microprocessor unit reads and performs program code of software stored in a storage component. The content received by the Bluetooth communication mechanism 71 as input from the wearable input device 1 is analyzed in the gesture/drag analysis mechanism 72. The analyzed input event is forwarded to the view manager mechanism 74, via the input event transmission mechanism 73.

The view manager mechanism 74 controls changing a component of a screen according to content of an input event, such as a moving pointer. An example of a view manager mechanism 74 is a window manager. The application mechanism 75 can receive the view manager's 74 process results, perform the process according to the input event, and control each component in target 70A. The execution result of the input event by the application mechanism 75 is received, the view manager mechanism 74 changes the component of a screen, and supplies change content to the graphics mechanism 76.

Graphics mechanism 76 comprises a screen which generates image data of a screen and supplies it to the drawing mechanism 77. An example of a graphics mechanism 76 is a graphical user interface (GUI). The drawing mechanism 77 obtains image data of the screen from the graphics mechanism 76 onto the display mechanism 78 using a frame buffer, as an example. A liquid crystal display can be used as a display panel with the display mechanism 78. The Wi-Fi communication mechanism 79 communicates according to telecommunications standards between other targets, such as target 70B. A structure of target 70B is similar to or the same as target 70A.

The wearable input device 1 considers a rotation operation first as a motion at the time of switching of an input mode. However, it may classify an input mode into a switching mode by carrying out a two-stage push-key utilization. As an example, the structure of a thin-shaped two-stage operation tactile push switch, such as a two-stage push-key can be used.

FIG. 11 is an exemplary flowchart for a process of an input system, such as input system 100. An example is given for a ring-type input device. However, other input devices can be used, such as a handheld input device. The process is given from the perspective of the input device 1 and the target 70A as illustrated in FIG. 10. In step S1, the user 2 holds down the power supply key 11 for a period of time, such as 3-5 seconds to power on the input device 1. In step S2, the operation detection mechanism 15 of the input device 1 turns on the accelerometer 13 and the gyroscope 14, and turns on a Bluetooth function. The input mode of an initial stage is set to a gesture.

Figure 12A:
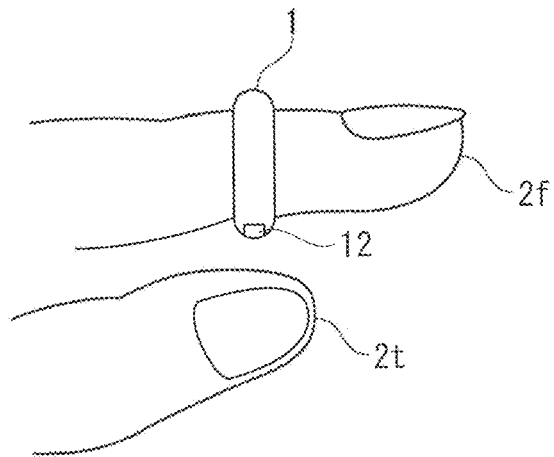
FIGS. 12A-12C each illustrate a mode of using an operation key of a portable input device according to one embodiment.
Figure 12B:
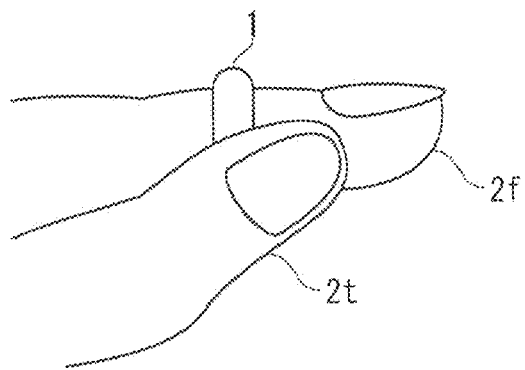

In step S3, the operation detection mechanism 15 determines whether a key operation has occurred within a predetermined time, such as five minutes. When there is no key operation in the predetermined time (a "yes" decision in step S3), the operation detection mechanism 15 turns off the power supply of the input device 1 in step S4. When a key operation does occur in the predetermined time (a "no" decision in step S3), the operation detection mechanism 15 determines whether the operation key 12 is pressed in step S5. When the operation key 12 is not pressed (a "no" decision in step S5), the operation detection mechanism 15 returns to the process flow at step S3. FIG. 12A illustrates a state in which the operation key 12 of the input device 1 is not pushed, i.e. the index finger 2f and thumb 2t are separated. FIG. 12B illustrates a state in which the operation key 12 of the input device 1 is pushed, wherein the thumb 2t contacts the operation key 12 of the input device 1.

When the operation key 12 is pressed (a "yes" decision in step S5), the operation detection mechanism 15 acquires acceleration data from the accelerometer 13 in step S6. In an embodiment, when the operation key 12 is pressed twice at the time of input, a vibration occurs to indicate detection of a drag gesture.

Figure 12C:
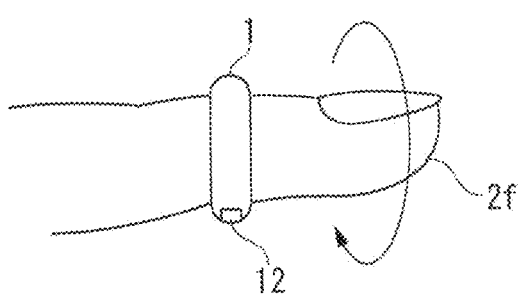

In step S7, the operation detection mechanism 15 determines from acceleration data whether a rotation gesture was detected. FIG. 12C illustrates one embodiment in which acceleration data would be generated, wherein the index finger 2f rotates, which is detected by the accelerometer and/or gyroscope within the input device 1. When a rotation gesture is detected (a "yes" decision in step S7), the operation detection mechanism 15 switches an input mode to drag mode in step S8. The rotation gesture is utilized for switching an input mode. However, switching the mode is not restricted to a rotation gesture.

When a rotation gesture is not detected in the determination processing (a "no" decision in step S7), the operation detection mechanism 15 determines whether the current input mode is a gesture mode. When the current input mode is a gesture mode (a "yes" decision in step S9), the operation detection mechanism 15 acquires acceleration data from the accelerometer 13 in step S10. The operation detection mechanism 15 determines whether the flick gesture was detected in step S11. When a flick gesture is not detected (a "no" decision in step S11), the operation detection mechanism 15 transfers to the determination processing of step S17. When a flick gesture is detected (a "yes" decision in step S11), it is determined whether the operation detection mechanism 15 was a flick gesture in the x-axis direction or the y-axis direction in step S12. When it is a flick gesture in the x-axis direction or the y-axis direction (a "yes" decision in step S12), the operation detection mechanism 15 transmits a gesture event to target 70A through the Bluetooth communication mechanism 16 in step S13. The application mechanism 75 of target 70A processes the gesture event received from the input device 1 in step S14.

Figure 13:
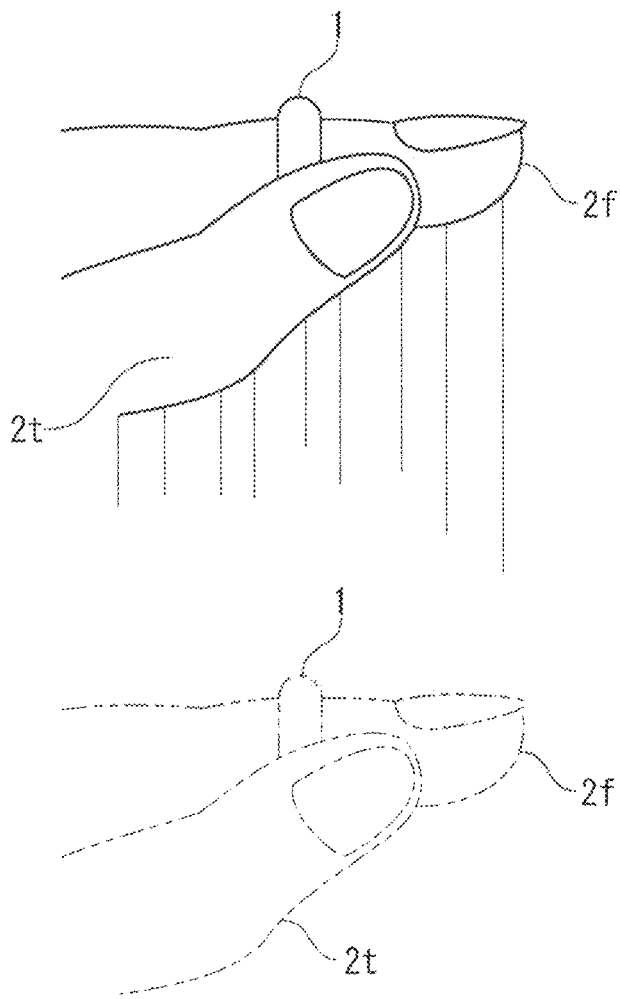
FIGS. 13-14 each illustrate a flick gesture of a portable input device according to one embodiment.
Figure 14:
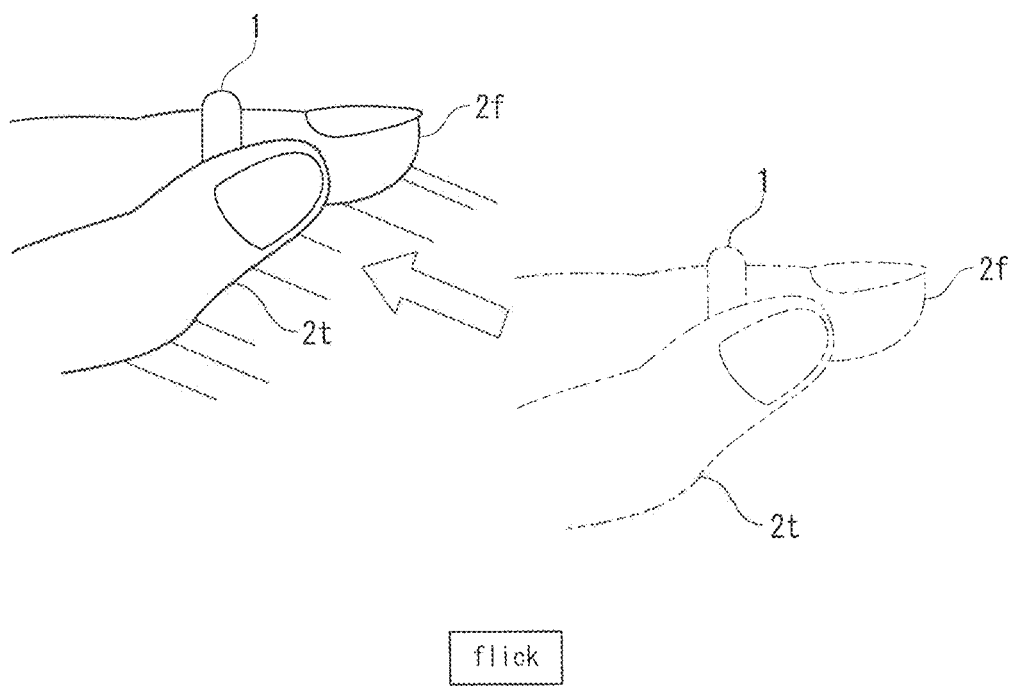

FIG. 13 illustrates an exemplary flick gesture. A user quickly moves the index finger 2f with the input device 1 mounted thereon in the upwards y-axis direction. The user's thumb 2t depresses the operation key 12 of the input device 1 while going through the flicking motion. FIG. 14 illustrates another exemplary flick gesture towards a side z-axis direction while depressing the operation key 12 of the input device 1 with the thumb 2t.

With reference back to FIG. 11, when the flick gesture is not in the x-axis or y-axis direction (a "no" decision in step S12), the operation detection mechanism 15 transmits a target switching event to target 70A through the Bluetooth communication mechanism 16 in step S15. The application mechanism 75 of target 70A processes the target switching event received from the wearable input device 1 in step S16, in which target 70A switches a control object terminal between target 70A and target 70B. In step S17, the operation detection mechanism 15 of the input device 1 determines whether the operation key 12 is still pressed or pressed again. When the operation key 12 is not pressed (a "no" decision in step S17), the operation detection mechanism 15 transfers to step S3. When the operation key 12 is pressed (a "yes" decision in step S17), the operation detection mechanism 15 transfers to step S10.

When the decision of step S9 for a gesture mode is no, i.e. when it is a drag mode, the operation detection mechanism 15 transmits the down event by the user 2 to target 70A through the Bluetooth communication mechanism 16 in step S18. A down event is the downward direction motion of the index finger 2f, which is equipped with the input device 1. This motion is used to contact the detector plane of a touchscreen. In FIG. 7, this motion is in the y-axis direction. The application mechanism 75 of target 70A processes the down event received from the input device 1 in step S19. Target 70A processes the down event using the coordinates designated by the last operation in the target 70A.

Figure 15:
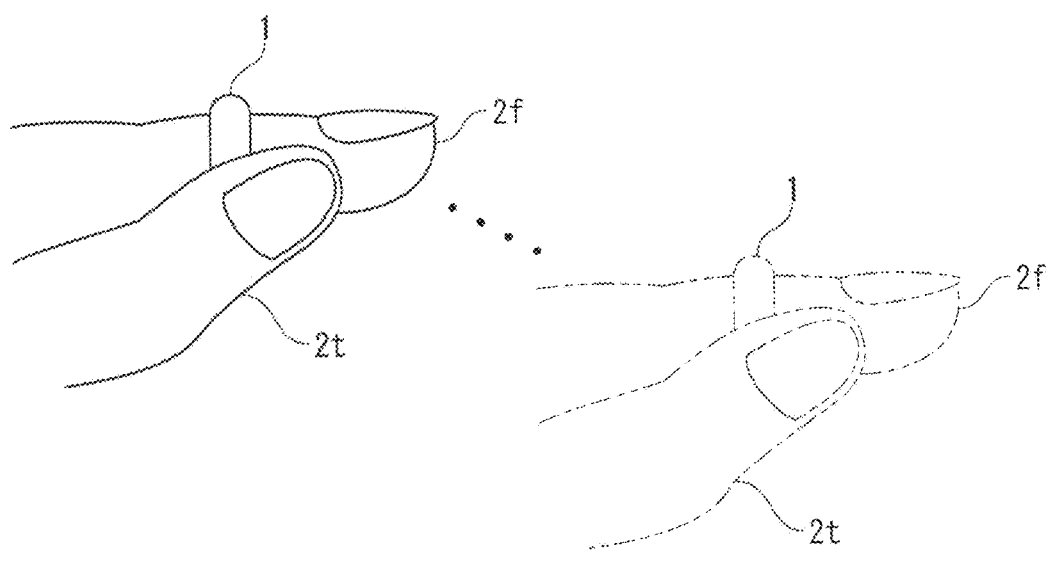
FIG. 15 illustrates a drag gesture of a portable input device according to one embodiment.

In step S20, the operation detection mechanism 15 of the input device 1 determines whether the operation key 12 is still depressed. When the operation key 12 is still depressed (a "yes" decision in step S20), the operation detection mechanism 15 acquires acceleration data from the accelerometer 13 in step S21. The operation detection mechanism 15 transmits vector information of a motion of the input device 1 to target 70A through the Bluetooth communication mechanism 16 in step S22. The application mechanism 75 of target 70A processes the drag event received from the input device 1 through the Bluetooth communication mechanism 71 in step S23. In an exemplary embodiment, the operation detection mechanism 15 could move the cursor or other markers displayed on the display mechanism 78 of the target 70A according to a motion of the input device 1. FIG. 15 illustrates an exemplary drag gesture in which a user moves the index finger 2f with the mounted input device 1 in a side direction or z-axis direction while depressing the control key 12 with the thumb 2t.

With reference back to FIG. 11, the operation detection mechanism 15 transfers to step S20 at the conclusion of step S23. In step S24, when the operation key 12 is no longer depressed (a "no" decision in step S20), the operation detection mechanism 15 transmits an up event to target 70A through the Bluetooth communication mechanism 16. An up event is a motion in which a user detaches from the detector plane of a touchscreen of the index finger 2f in which the input device 1 is mounted. With reference to FIG. 7, an up event motion is in the positive y-direction.

With reference back to FIG. 11, the application mechanism 75 of target 70A processes the up event received from the input device 1 in step S25. As an example, when the user 2 designates and drags a file icon displayed on the screen, movement of an applicable file is transferred to a place or a folder icon to which the up event was performed. The operation detection mechanism 15 transfers to step S3 at the conclusion of step S25.

Figure 16:
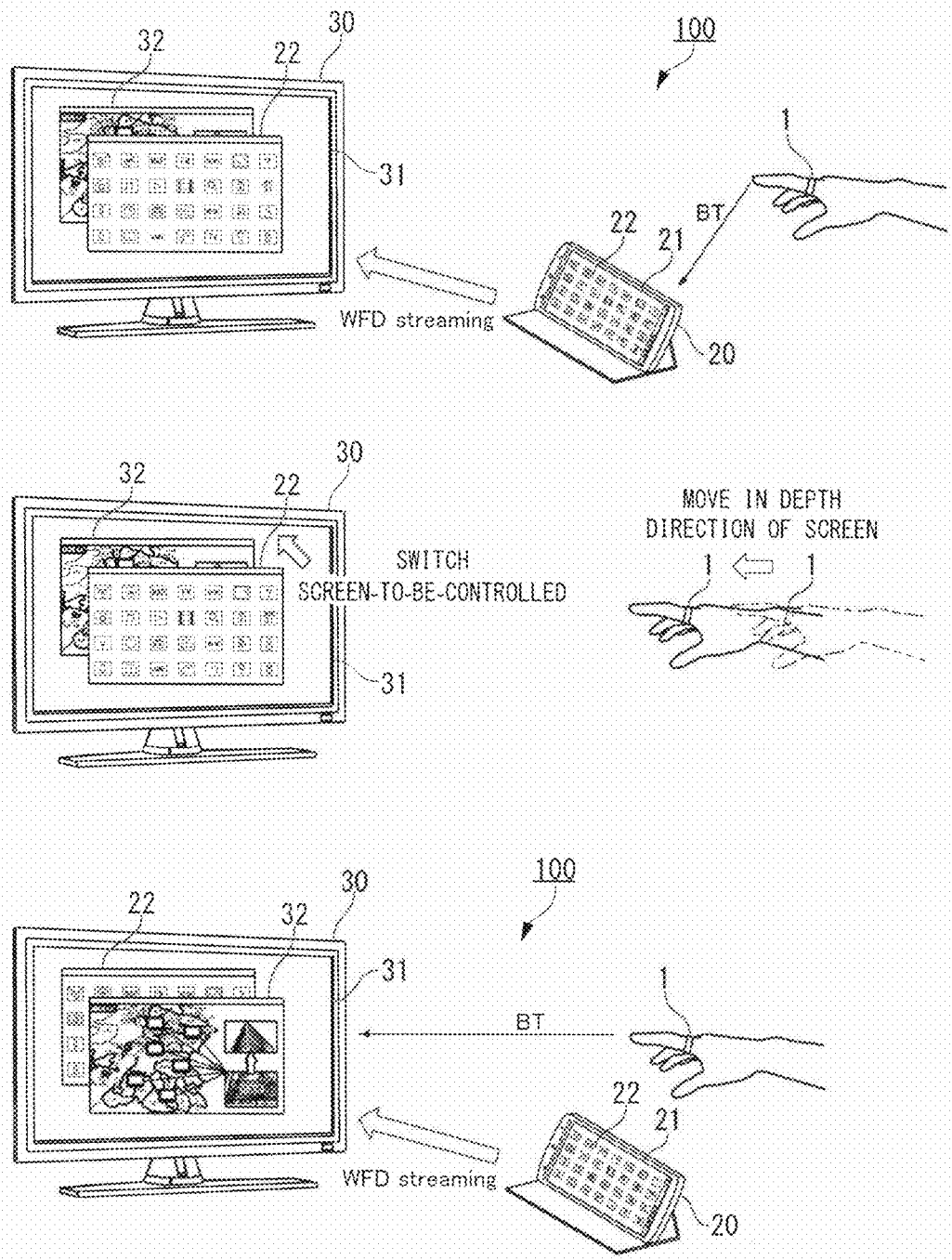
FIG. 16 illustrates switching a control object terminal according to one embodiment.

FIG. 16 illustrates an embodiment of switching a control object terminal. The upper drawing of FIG. 16 exemplifies a mode 100 in which a user operates the input device 1 mounted upon the user's finger. Through one or more gestures, the user designates the portable terminal 20 as the control object terminal through Bluetooth communication. The portable terminal 20 has transmitted image data of screen 22 from the screen display 21 to the screen display 31 of TV terminal 30 by a Wi-Fi transfer function. The screen display 31 of the TV terminal 30 illustrates screen 32 of the TV terminal 30 and screen 22 of the portable terminal 20. Since the portable terminal 20 is the control object terminal, screen 22 is displayed in front of screen 32 of the TV terminal 30.

The middle drawing of FIG. 16 exemplifies a mode in which the user operates the input device 1 to switch a control object terminal from the portable terminal 20 to the TV terminal 30. The user moves the input device 1 in the depth direction or z-axis direction of the screen display 31 to generate the control object switching event.

The lower drawing of FIG. 16 exemplifies a mode 100 in which the user operates the input device 1 to input into the TV terminal 30 after switching a control object terminal from the portable terminal 20 to the TV terminal 30. The screen display 31 of the TV terminal 30 illustrates screen 32 in the forefront of the screen display 31 of TV terminal 30, which is a control object terminal after switching the displayed screen 22. The user operates the input device 1 and performs input operations to the TV terminal 30 through Bluetooth communications.

Figure 17:
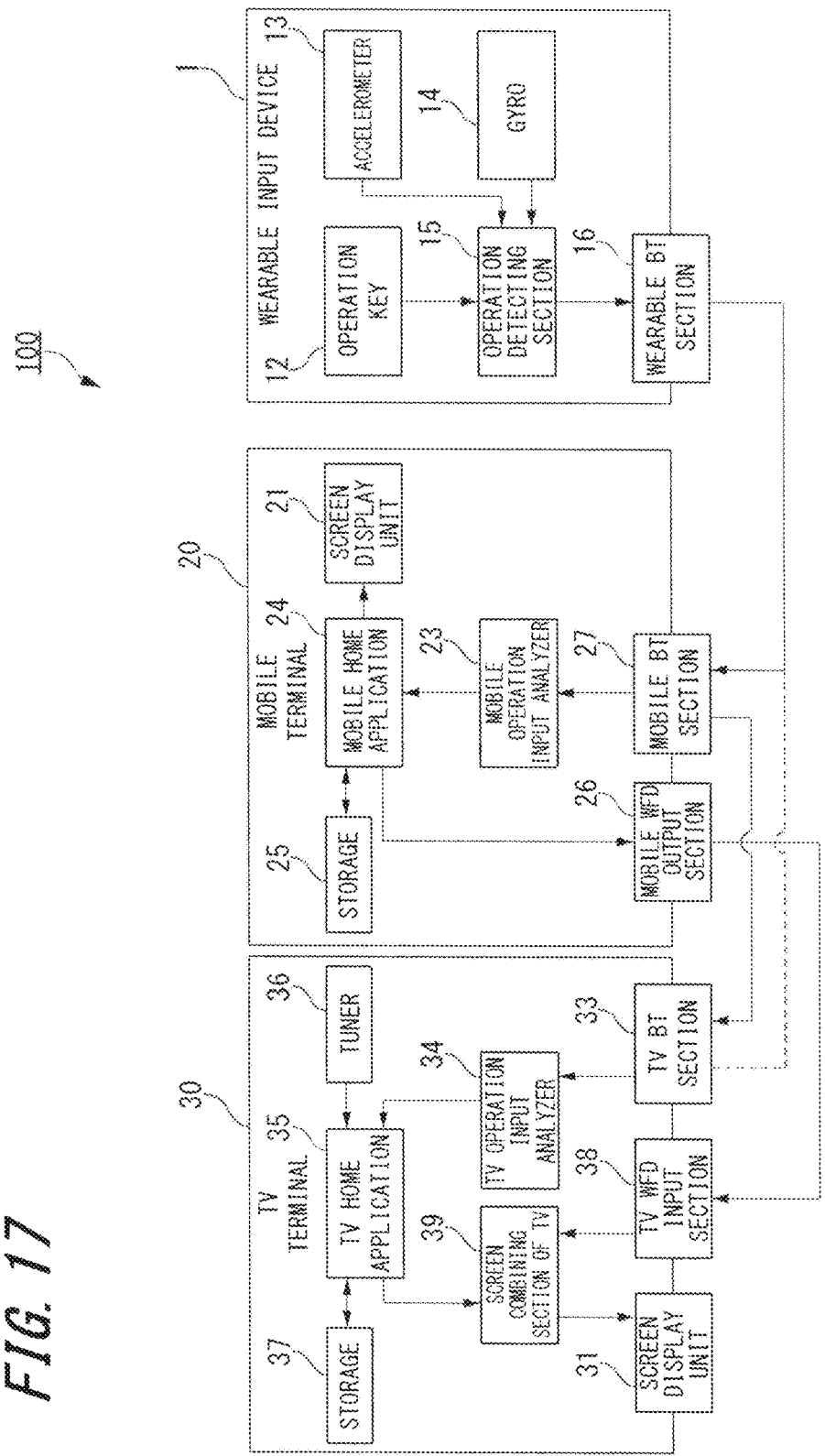
FIG. 17 is a block diagram of an exemplary system of an input device before switching a control object terminal according to one embodiment.

FIG. 17 illustrates an exemplary system 100 of an input device 1, a portable terminal 20, and a TV terminal 30 before switching a control object terminal according to embodiments described herein. The input device 1 includes a wearable input device, such as a ring, or a handheld device. The input device 1 includes a Bluetooth communication mechanism 16, which was previously illustrated in FIG. 10. The portable terminal 20 is a first terminal device that is equipped with a portable screen display 21, a portable operation input analysis mechanism 23, a portable home application mechanism 24, a storage mechanism 25, a portable Wi-Fi output mechanism 26 (a first data communication component), and a portable Bluetooth communication mechanism 27. The portable screen display mechanism 21 corresponds to component 77 and the display 78 illustrated in FIG. 10.

In FIG. 17, the portable operation input analysis mechanism 23 corresponds to a gesture drag analysis mechanism 72 and the input event transmission mechanism 73 in FIG. 10. The portable home application mechanism 24 corresponds to the application mechanism 75 which controls each block in the portable terminal 20. The storage mechanism 25 stores parameters used by the portable home application mechanism 24 and the generated data, as an example. The storage mechanism 25 has a function of a frame buffer. The portable Wi-Fi output mechanism 26 corresponds to the Wi-Fi communication mechanism 79. The portable Bluetooth mechanism 27 corresponds to the Bluetooth communication mechanism 71.

In FIG. 17, the TV terminal 30 is a second terminal device equipped with a TV screen display 31, a TV Bluetooth mechanism 33, a TV operation input analysis mechanism 34, a TV home application mechanism 35, a tuner 36, a storage mechanism 37, a TV Wi-Fi input mechanism 38, and a TV screen synthesizing section 39. The TV screen display 31 corresponds to the drawing component 77 and the display 78 illustrated in FIG. 10. The TV Bluetooth mechanism 33 corresponds to the Bluetooth communication mechanism 71. The TV operation input analysis mechanism 34 corresponds to the gesture drag analysis mechanism 72 and the input event transmission mechanism 73.

The TV home application mechanism 35 corresponds to application 75 and controls each block in the TV terminal 30. The tuner 36 receives a television signal and supplies the signal to the TV home application mechanism 35. The storage mechanism 37 stores the parameter used by the TV home application mechanism 35 and the generated data, as an example. The storage mechanism 37 includes the function of a frame buffer.

The TV Wi-Fi input mechanism 38 corresponds to the Wi-Fi communication component 79 in FIG. 10. The TV screen synthesizing mechanism 39 corresponds to the view manager 74 and the graphics component 76. As illustrated in FIG. 17, when the portable terminal 20 is a control object terminal, the communication based on the portable terminal 20 and Bluetooth is possible for the input device 1. However, it is in a state in which Bluetooth communication with the TV terminal 30 is not possible. The portable terminal 20 and the TV terminal 30 are in a state in which communication is based on Wi-Fi communication.

Figure 18:
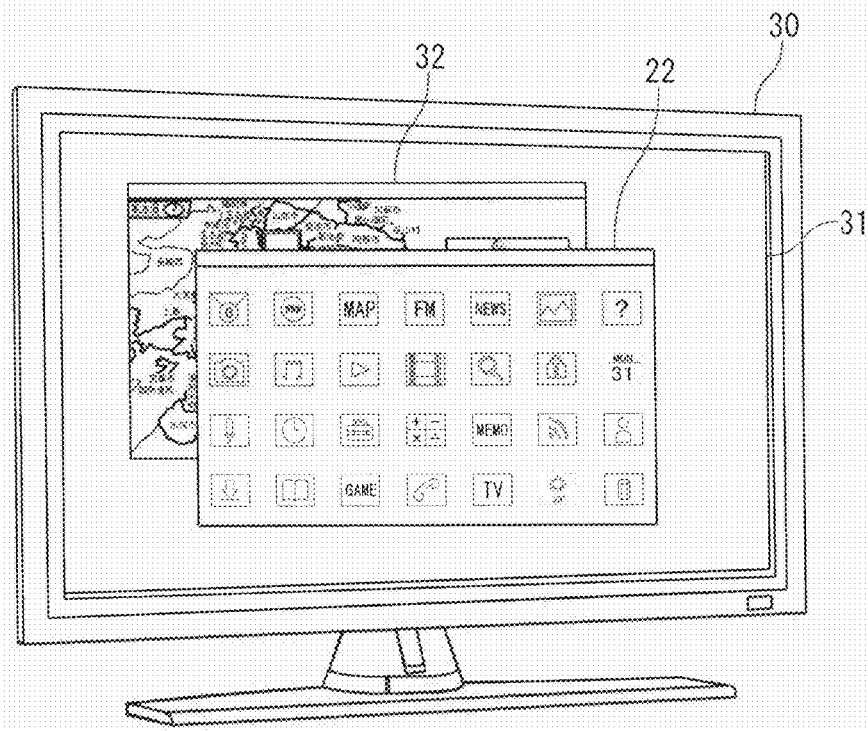
FIG. 18 illustrates an exemplary screen display prior to switching according to one embodiment.

FIG. 18 illustrates an exemplary screen display prior to switching a control object terminal. In the screen display 31 of the TV terminal 30, the TV home screen 32 and the portable home screen 22 of the portable terminal 20 are displayed.

Figure 19:
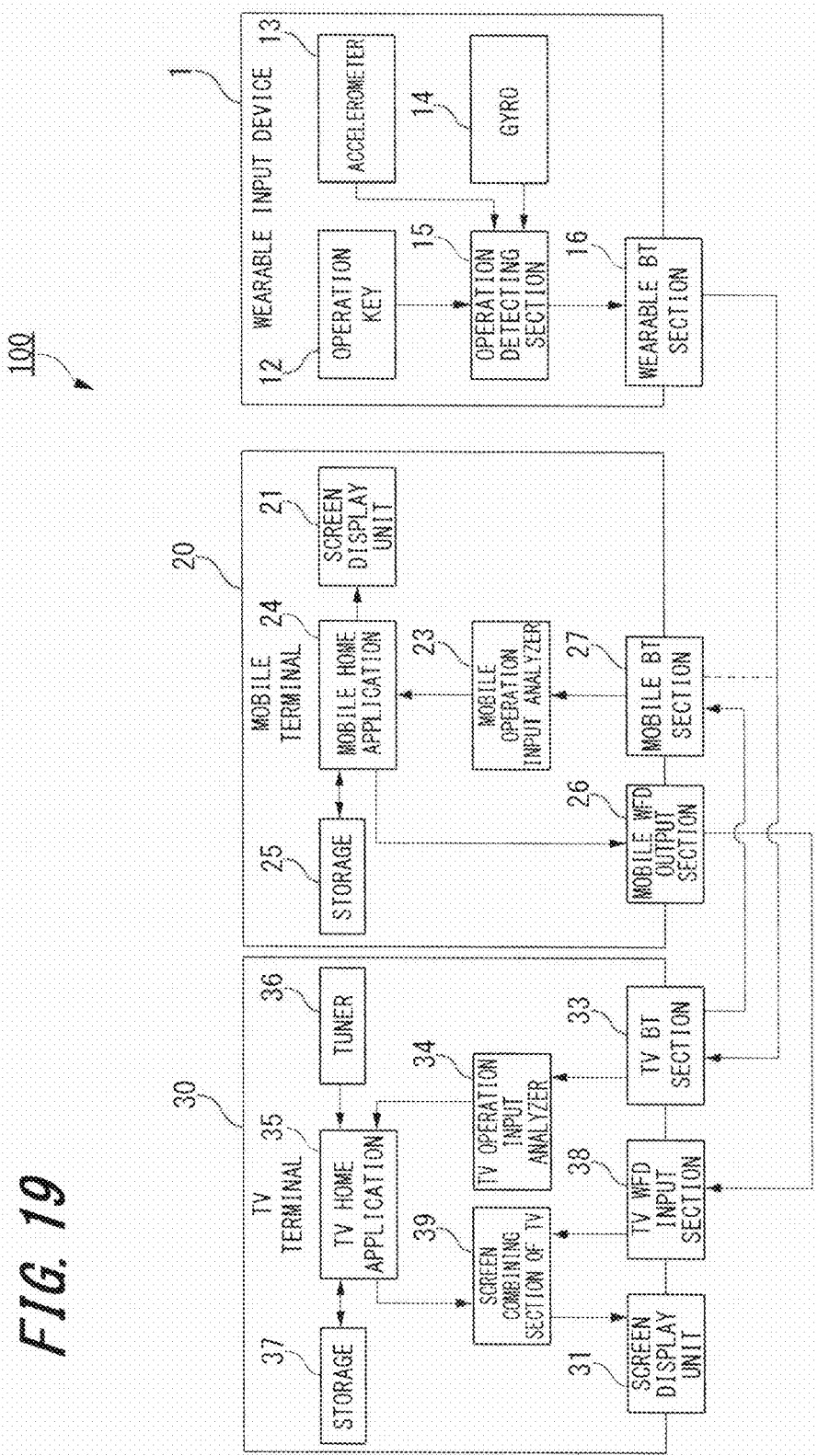
FIG. 19 is a block diagram of an exemplary system after switching a control object terminal according to one embodiment.

FIG. 19 illustrates an exemplary system 100 of an input device 1, a portable terminal 20, and a TV terminal 30 after switching a control object terminal according to embodiments described herein. When a control object terminal is switched from the portable terminal 20 to the TV terminal 30, the communication based on Bluetooth is possible between the TV terminal 30 and the input device 1. However, they cannot communication with the portable terminal 20, via Bluetooth since communication between the portable terminal 20 and the TV terminal 30 is based on Wi-Fi communication.

Figure 20:
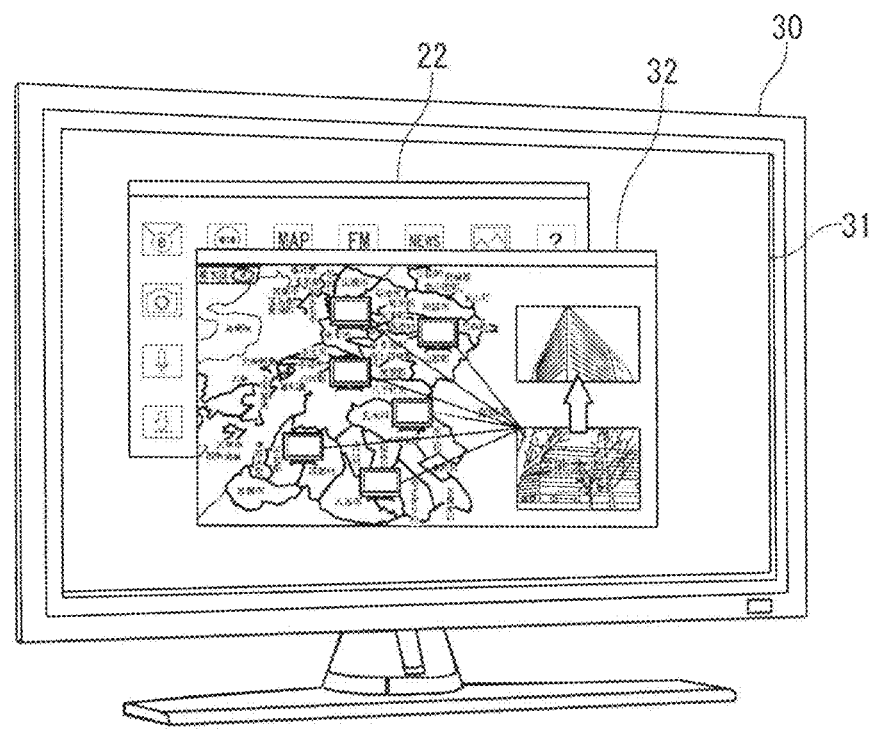
FIG. 20 illustrates a display screen after switching a control object terminal according to one embodiment.

FIG. 20 is an exemplary illustration of a display screen after switching a control object terminal. The screen display 31 of the TV terminal 30 contains screen 22 of the portable terminal 20, as well as screen 32 of the TV terminal 30. TV terminal 30 is the control object terminal after switching the control object terminal.

Figure 21:
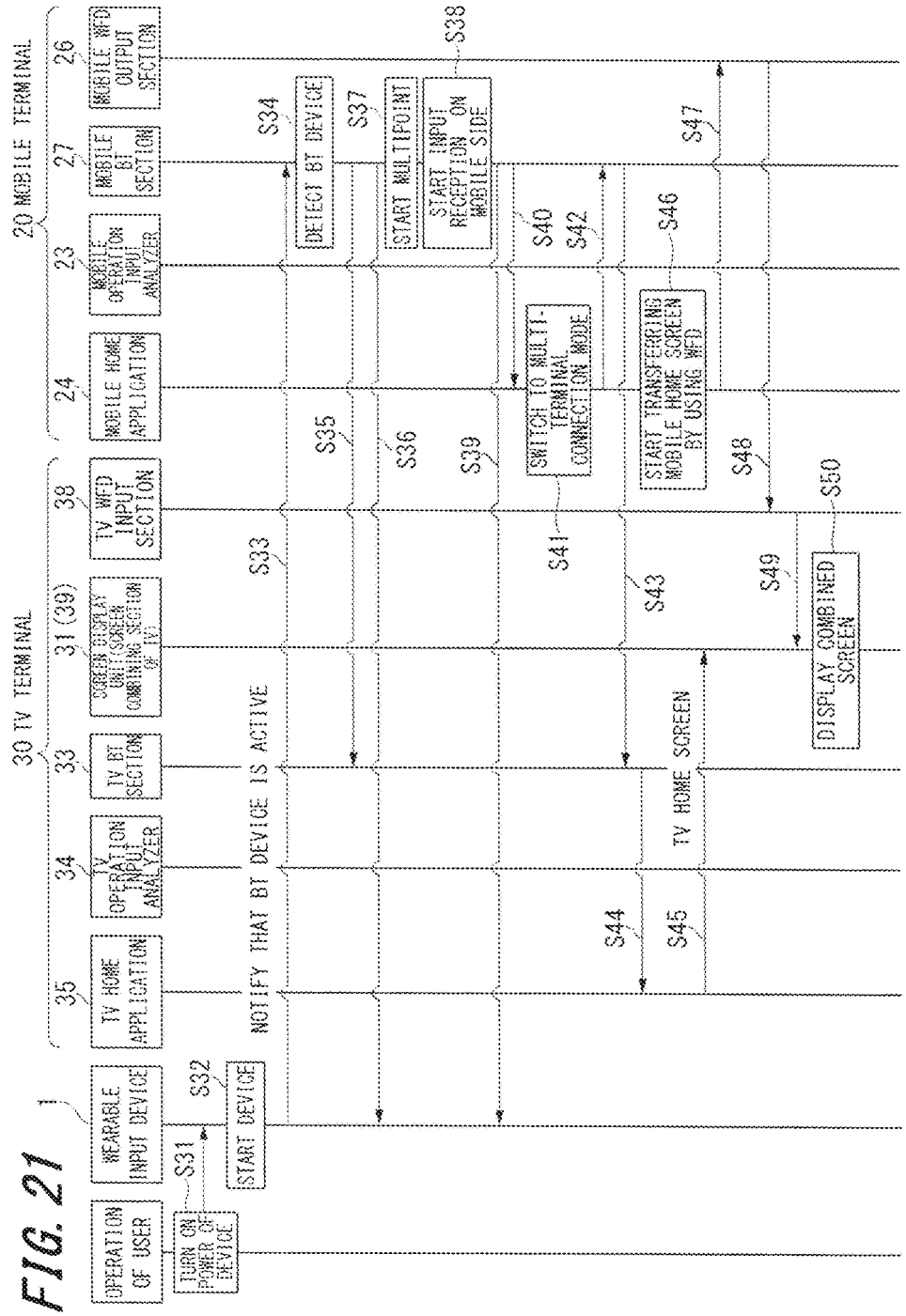
FIG. 21 illustrates a sequence of events to create a synthetic screen display according to one embodiment.

FIG. 21 illustrates a sequence of events to create a synthetic screen display. The input system includes content from the input device 1, the portable terminal 20, and the TV terminal 30. FIG. 21 illustrates a sequence in which the synthetic screen of screen 32 (a TV home screen) and screen 22 of the portable terminal 20 are displayed in the TV screen display 31 of the TV terminal 30. The user 2 presses down the power supply key 11 of the input device 1 in step S31. The operation detection mechanism 15 of the input device 1 detects that the power supply key 11 has been depressed and turns on a power supply in step S32.

In step S33, the wearable Bluetooth mechanism 16 of the input device 1 notifies the portable Bluetooth mechanism 27 of an active Bluetooth device. In step S34, the portable Bluetooth mechanism 27 of the portable terminal 20 receives notification from the input device 1 and searches for the Bluetooth device on a periphery. In steps S35 and S36, the portable Bluetooth mechanism 27 searches the TV terminal 30 and the input device 1, as an example. The TV terminal 30 and the wearable input device 1 respond to the portable Bluetooth mechanism 27 when it exists in a state which can be discovered as a Bluetooth device. In step S37, the portable Bluetooth mechanism 27 starts a multipoint connection with the portable terminal 20 and the TV terminal 30 when the response from the portable terminal 20 and the TV terminal 30 is detected.

In step S38, the portable Bluetooth mechanism 27 starts an input registration at the side of the portable terminal 20. In step S39, the portable Bluetooth mechanism 27 sends notification to the input device 1 that input registration has started on the portable terminal 20 side. In step S40, the portable Bluetooth mechanism 27 sends notification to the portable home application mechanism 24 that the portable home application mechanism 24 has started input registration. In step S41, the portable home application mechanism 24 switches to a multi-terminal connection mode.

In step S42, the portable home application mechanism 24 notifies the portable Bluetooth mechanism 27 it is switched to a multi-terminal connection mode. In step S43, the portable Bluetooth mechanism 27 notifies the TV Bluetooth mechanism 33 that the portable terminal 20 has switched to a multi-terminal connection mode. In step S44, the TV Bluetooth mechanism 33 transfers the notification from the portable Bluetooth mechanism 27 of the portable terminal 20 to the TV home application mechanism 35. In step S45, the TV home application mechanism 35 generates a TV home screen, such as the screen 32 illustrated in FIG. 16, and outputs it to the TV screen synthesizing mechanism 39.

In step S46, the portable home application mechanism 24 generates a portable home screen, such as screen 22 illustrated in FIG. 16, and starts a Wi-Fi transfer. The Wi-Fi connection has established the portable terminal 20 and the TV terminal 30 in advance in one embodiment. However, when it is not connected, the Wi-Fi connection may be established at the present time in another embodiment. In step S47, the portable home application mechanism 24 outputs a portable home screen to the portable Wi-Fi output mechanism 26 and orders a Wi-Fi transfer. In step S48, the portable Wi-Fi output mechanism 26 outputs a portable home screen to the TV Wi-Fi input mechanism 38 of the TV terminal 30. In step S49, the TV Wi-Fi input mechanism 38 of the TV terminal 30 transfers the portable home screen received from the portable Wi-Fi output mechanism 26 of the portable terminal 20 to the TV screen synthesizing mechanism 39.

In step S50, the TV screen synthesizing mechanism 39 generates a combined TV home screen and the portable home screen to output a synthetic screen to TV screen display mechanism 31. The TV screen display mechanism 31 displays a synthetic screen.

At this time, the portable terminal 20 is set to the control object terminal as a default configuration for example, and a portable home screen is displayed on the TV home screen. In another example, a flag is set in an active screen which enables it to identify the TV home application mechanism 35 of the TV terminal 30 from another screen. In this example, a flag is set to a portable home screen.

Figure 22:
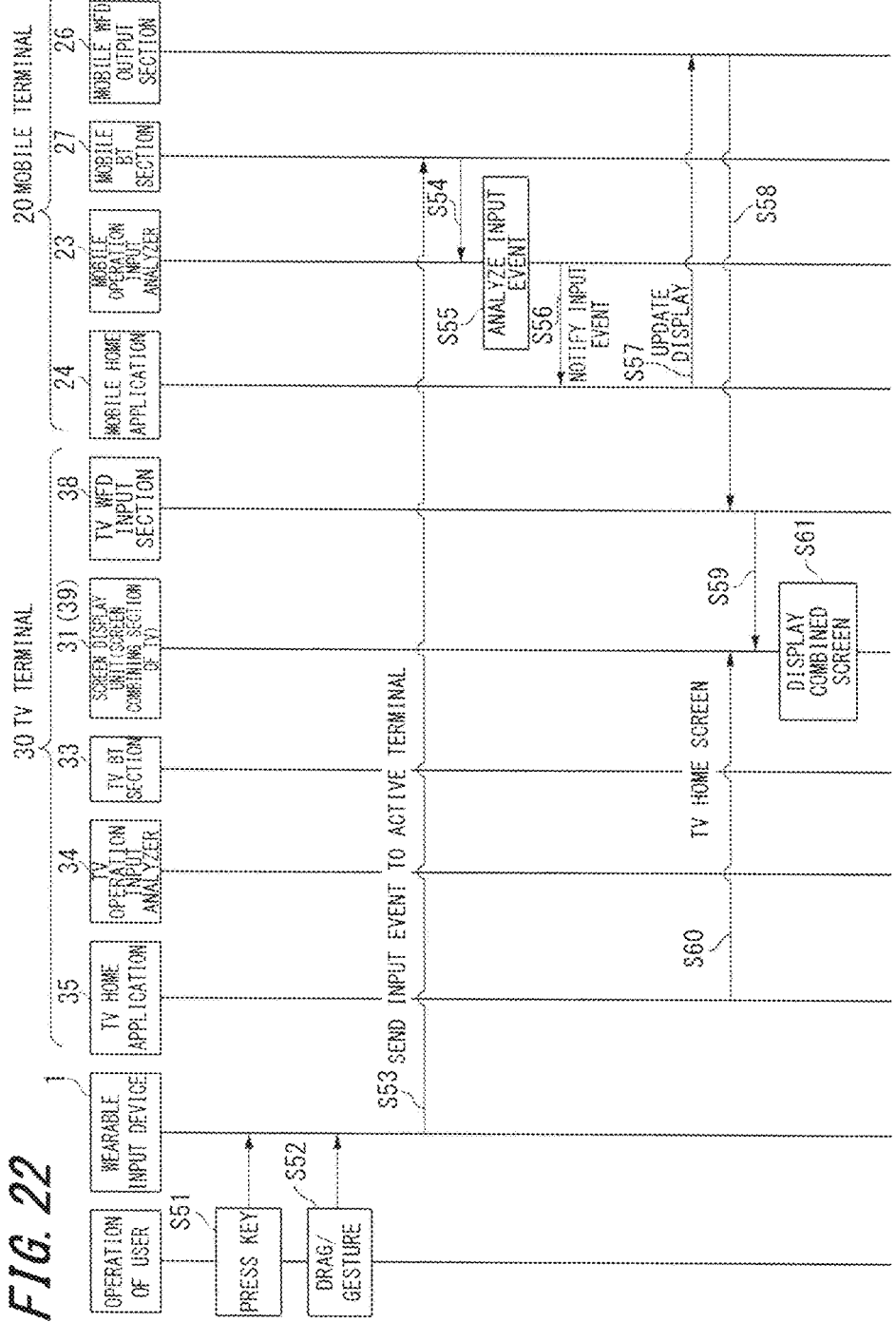
FIG. 22 illustrates a sequence of events in which a portable home screen is an active screen according to one embodiment.

FIG. 22 illustrates an input operation sequence in which a portable home screen is an active screen when the synthetic screen of the TV home screen and a portable home screen are displayed on TV terminal 30. In step S51, the user 2 presses down the power supply key 11 of the input device 1. In step S52, the user 2 presses the operation key 12 of the input device and performs a drag gesture. In this embodiment, the acceleration data output from the accelerometer 13 can be analyzed more correctly and exact input information can be obtained.

In step S53, the operation detection mechanism 15 of the input device 1 transmits an input event to the portable Bluetooth mechanism 27 of the portable terminal 20, which is an active terminal through Bluetooth mechanism 16. In step S54, the portable Bluetooth mechanism 27 of the portable terminal 20 sends notification of the input event received from the input device 1 to the portable operation input analysis mechanism 23. In step S55, the portable operation input analysis mechanism 23 analyzes the notified input event.

In step S56, the portable operation input analysis mechanism 23 sends notification of the analyzed result of the input event to the portable home application mechanism 24. In step S57, the portable home application mechanism 24 displays the updated process according to the analysis result of the input event. The portable home application mechanism 24 outputs the portable home screen updated according to the input event to the portable Wi-Fi output mechanism 26, and orders a Wi-Fi transfer. In step S58, the portable Wi-Fi output mechanism 26 outputs the portable home screen after an update to the TV Wi-Fi input mechanism 38 for the TV terminal 30. In step S59, the TV Wi-Fi input mechanism 38 of the TV terminal 30 transfers the portable home screen after the update received from the portable Wi-Fi output mechanism 26 of the portable terminal 20 to the TV screen synthesizing mechanism 39.

In step S60, the TV home application mechanism 35 generates a TV home screen and outputs it to the TV screen synthesizing mechanism 39. In step S61, the TV screen synthesizing mechanism 39 generates the screen which combines the TV home screen and the portable home screen after an update, and outputs a synthetic screen to the TV screen display mechanism 31. The TV screen display mechanism 31 displays the synthetic screen after the update.

Figure 23:
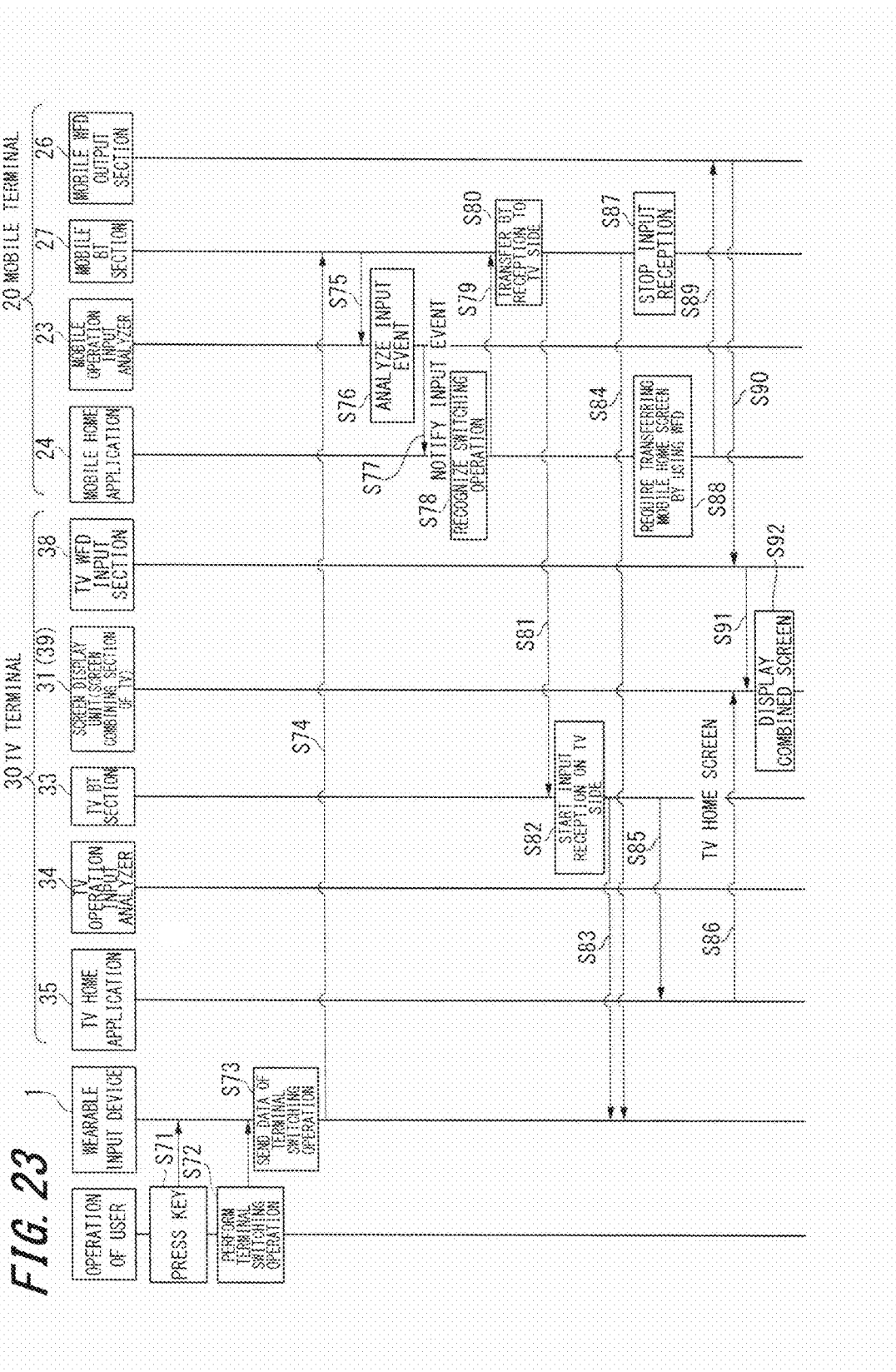
FIGS. 23-24 each illustrate a sequence of events of switching a control object terminal from a portable terminal to a TV terminal according to one embodiment.

FIG. 23 illustrates a sequence at the time of switching a control object terminal from the portable terminal 20 to the TV terminal 30. The user 2 presses down the power supply key 11 of the input device 1 in step S71. The user 2 performs an operation to switch a control object terminal by pressing the operation key 12 in step S72. The operation detection mechanism 15 of the input device 1 transmits the data of the input event to switch a control object terminal in step S73. The Bluetooth mechanism 16 of the input device 1 transmits an input event to the portable Bluetooth mechanism 27 of the portable terminal 20 in step S74.

In step S75, the portable Bluetooth mechanism 27 of the portable terminal 20 sends notification that the input event has been received to the portable operation input analysis mechanism 23. In step S76, the portable operation input analysis mechanism 23 analyzes the input event. In step S77, the portable operation input analysis mechanism 23 notifies the portable home application mechanism 24 of the analyzed results of the input event. In step S78, the portable home application mechanism 24 recognizes the input event is an event of control object terminal switching.

In step S79, the portable home application mechanism 24 notifies the portable Bluetooth mechanism 27 of the control object terminal switching event. In step S80, the portable Bluetooth mechanism 27 transfers the input reception of Bluetooth to the TV terminal 30 side. In step S81, the portable Bluetooth mechanism 27 notifies the TV Bluetooth mechanism 33 of the TV terminal 30 that the input reception of Bluetooth was transferred to the TV terminal 30 side. In step S82, the TV Bluetooth mechanism 33 of the TV terminal 30 starts the input registration at the side of the TV terminal 30.

In step S83, the TV Bluetooth mechanism 33 notifies the input device 1 that input registration has started at the TV terminal 30 side. In step S84, the portable Bluetooth mechanism 27 of the portable terminal 20 notifies the input device 1 that an input reception has stopped. In step S85, the TV Bluetooth mechanism 33 of the TV terminal 30 transfers initiation of the input registration by the TV terminal 30 side to the TV home application mechanism 35. In step S86, the TV home application mechanism 35 generates a TV home screen and outputs it to the TV screen synthesizing mechanism 39.

In step S87, the portable Bluetooth mechanism 27 of the portable terminal 20 stops reception of the input. In step S88, the portable home application mechanism 24 generates a portable home screen and requests a Wi-Fi transfer. In step S89, the portable home application mechanism 24 outputs a portable home screen to the portable Wi-Fi output mechanism 26 and orders a Wi-Fi transfer. In step S90, the portable Wi-Fi output mechanism 26 of the portable terminal 20 outputs a portable home screen to the TV Wi-Fi input mechanism 38 of the TV terminal 30. In step S91, the TV Wi-Fi input mechanism 38 of the TV terminal 30 transfers the portable home screen received from the portable Wi-Fi output mechanism 26 of the portable terminal 20 to the TV screen synthesizing mechanism 39. In step S92, the TV screen synthesizing mechanism 39 generates a combined TV home screen and the portable home screen to output a synthetic screen to TV screen display 31. The TV screen display 31 displays a synthetic screen.

Figure 24:
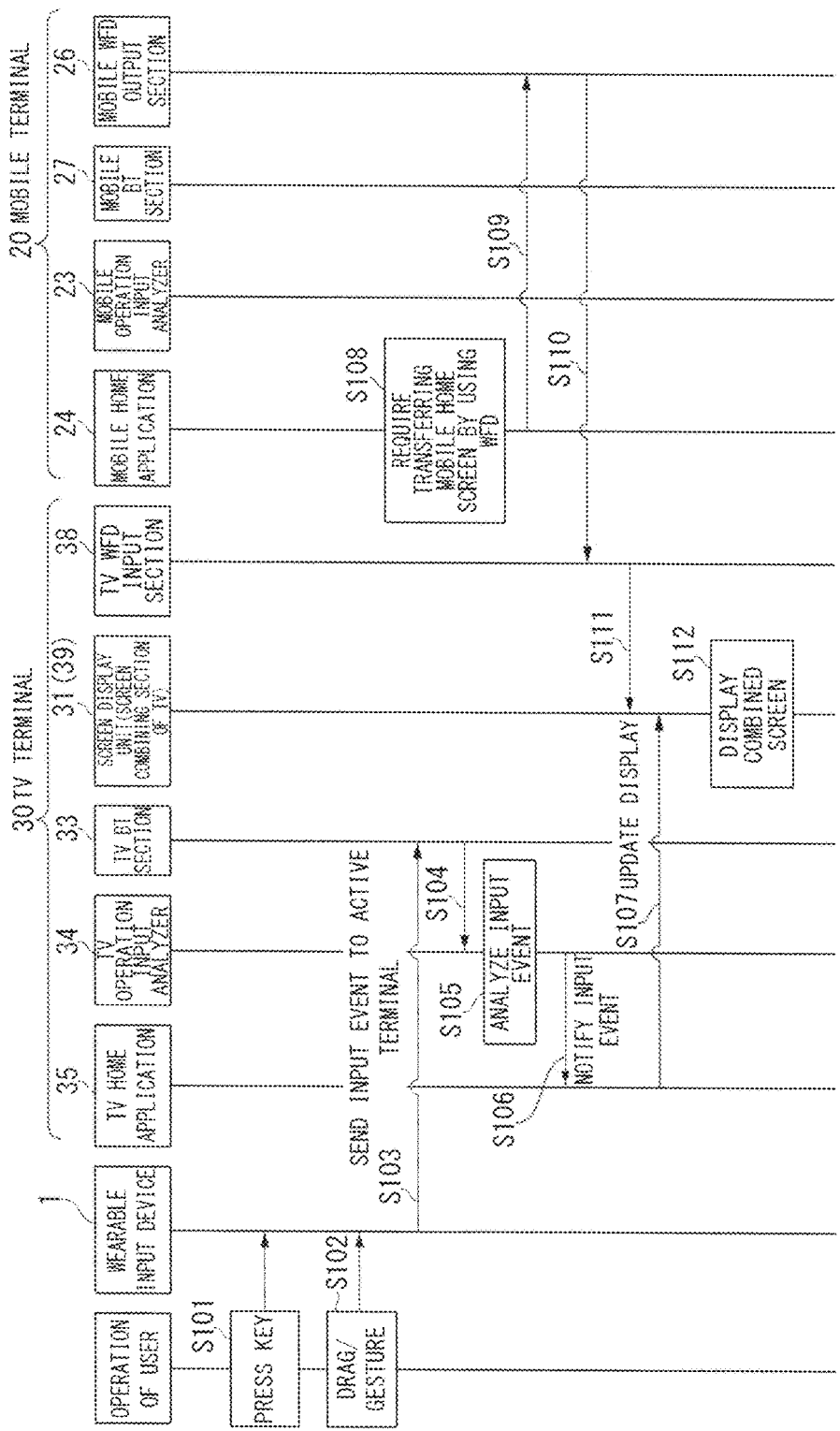

FIG. 24 illustrates an input operation sequence of a control object terminal switching from the portable terminal 20 to the TV terminal 30. In step S101, the user 2 presses down the power supply key 11 of the input device 1. In step S102, the user 2 presses the operation key 12 of the input device and performs a drag gesture operation. In this embodiment, the acceleration data output from the accelerometer 13 can be analyzed more correctly and exact input information can be obtained. In step S103, the operation detection mechanism 15 of the input device 1 transmits an input event to the TV Bluetooth mechanism 33 of the TV terminal 30 through the wearable Bluetooth mechanism 16. TV terminal 30 is an active terminal, i.e. the control object terminal. In step S104, the TV Bluetooth mechanism 33 of the TV terminal 30 notifies the TV operation input analysis mechanism 34 of the input event received from the input device 1.

In step S105, the TV operation input analysis mechanism 34 analyzes the input event. In step S106, the TV operation input analysis mechanism 34 notifies the TV home application mechanism 35 of the analyzed results of the input event. In step S107, the TV home application mechanism 35 performs a display update process according to the analyzed result of the input event. The TV home application mechanism 35 updates the TV home screen and outputs it to the TV screen synthesizing section 39.

In step S108, the portable home application mechanism 24 of the portable terminal 20 generates a portable home screen and requests a Wi-Fi transfer. In step S109, the portable home application mechanism 24 outputs a portable home screen to the portable Wi-Fi output mechanism 26 and orders a Wi-Fi transfer. In step S110, the portable Wi-Fi output mechanism 26 outputs a portable home screen to the TV Wi-Fi input mechanism 38 of the TV terminal 30. In step S111, the TV Wi-Fi input mechanism 38 of the TV terminal 30 transfers the portable home screen received from the portable Wi-Fi output mechanism 26 to the TV screen synthesizing mechanism 39. In step S112, the TV screen synthesizing mechanism 39 generates a combined TV home screen and the portable home screen to output a synthetic screen to TV screen display mechanism 31. The TV screen display mechanism 31 displays a synthetic screen.

Figure 25:
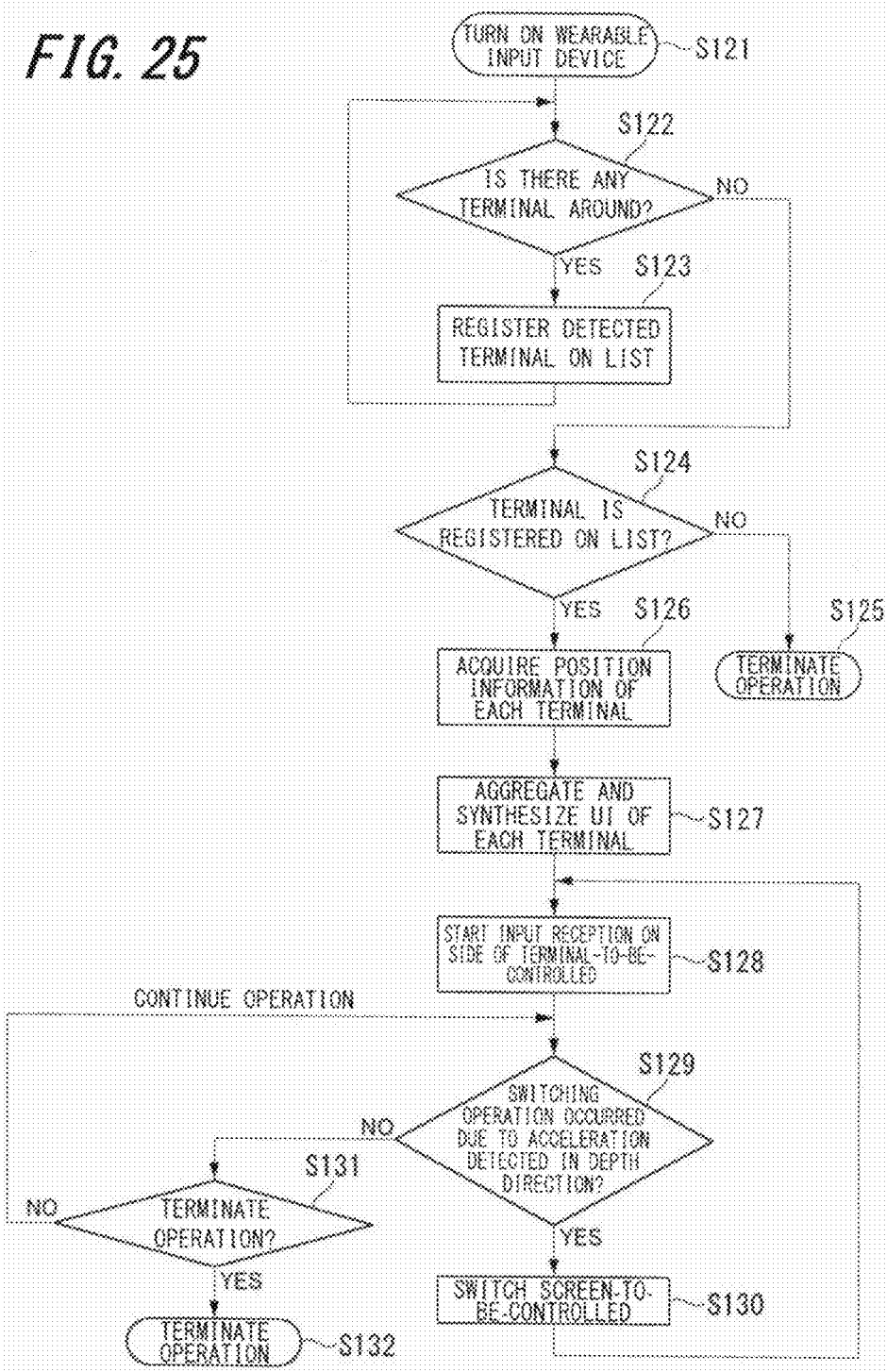
FIG. 25 is a flow diagram of a user interface configuration based on a signal strength of Bluetooth according to one embodiment.

FIG. 25 is a flow diagram illustrating a processing flow of the user interface configuration based on a signal strength of Bluetooth. Bluetooth communicates by changing a signal strength with respect to a distance between a signal source and a receptor. The input system estimates a distance of the wearable input device 1 and each terminal, based on the signal strength or field intensity of Bluetooth. A presumed result is reflected in the user interface configuration of the synthetic screen. When an input system is displayed on a screen display mechanism, the depth direction of the screen of each terminal is determined according to the distance between the input device 1 and the associated terminal.

FIG. 25 illustrates a flow of the user configuration based on the Bluetooth signal strength. The input system includes the wearable input device 1, the portable terminal 20, and the TV terminal 30. In step S121, the user 2 turns on the power supply of the input device 1. In step S122, the Bluetooth communication mechanism 16 of the input device 1 attempts to communicate with a surrounding terminal using the largest signal strength or field intensity for Bluetooth according to a command of the distance estimation mechanism 17. The distance estimation mechanism 17 determines whether there is a terminal on a periphery from the result of the Bluetooth communication mechanism 16 and a surrounding terminal. When a terminal does not exist on a periphery, the input device 1 transfers to step S124.

In step S123, when there is a surrounding terminal (a "yes" decision in step S122), the distance estimation mechanism 17 registers the information, which identifies the terminal associated with the response into a list stored in the storage mechanism 18. The input device 1 returns to step S122 at the conclusion of step S123.

In step S124, when a terminal does not exist on a periphery as determined in step S122, the distance estimation mechanism 17 determines whether a list has registration of a terminal. In step S125, when there is no registration of a terminal in the list (a "no" decision in step S124), the input device 1 ends the operation.

In step S126, when a terminal is listed in the terminal registration table (a "yes" decision in step S124), the distance estimation mechanism 17 of the input device 1 estimates the distance of the terminal from the input device 1. The distance estimation mechanism 17 acquires the positional information of the input device 1 for each terminal registered in the registration table. The registration table stores the relationship of the Bluetooth signal strength and the distance of each terminal in the storage mechanism 18. The distance estimation mechanism 17 matches the information with the positional information which identifies each terminal, and stores the information temporarily in the storage mechanism 18.

In step S127, the Bluetooth communication mechanism 16 of the input device 1 transmits the information which identifies each terminal stored in the storage mechanism 18 with positional information to a control object terminal, such as portable terminal 20. The portable terminal 20 transfers the terminal identification information and positional information to the TV terminal 30, based on Bluetooth. The TV home application mechanism 35 of the TV terminal 30 determines the arrangement of screen 32 of TV terminal 30, and screen 22 of the portable terminal 20 displayed on the active screen of TV screen display 31.

In step S128, a control object terminal begins input registration by Bluetooth from the input device 1. In step S129, the control object terminal determines whether to switch the control object terminal according to acceleration detected in a depth direction from the input device 1. In step S130, when switching of the control object terminal occurs (a "yes" decision in step S129), the portable terminal 20 and the TV terminal 30 are switched as the control object terminal. In step S131, when switching of the control object terminal does not occur (a "no" decision in step S129), a control object terminal determines whether to close operation. When operations are to be terminated (a "yes" decision in step S131), the input device 1 ends the operation in step S132. When a closing operation is not conducted (a "no" decision in step S131), the input device 1 is transferred to step S129.

FIGS. 26A-26B illustrate a first embodiment of a multiple terminal arrangement and a user interface configuration. In one embodiment, a user interface structure displays each terminal on the front screen sequentially according to a distance from the input device 1. For the input system 100 of FIG. 26A, the distance between the input device 1 mounted on a finger of a user and each terminal occurs in the order of the portable terminal 20 being the closest, the tablet-type terminal 50 at a mid-distance, and the TV terminal 30 being the most distant terminal from the input device 1. In FIG. 26B, the screen display 31 of the TV terminal 30 displays screen 22 of the portable terminal 20 in front view (the closest terminal to the input device in FIG. 26A), screen 52 of the tablet-type terminal 50 (the next closest terminal to the input device in FIG. 26A), and screen 32 of the TV terminal in the most rear view (the most distant terminal to the input device in FIG. 26A). The active screen, screen 22 is displayed on the front view of the screen display 31. FIGS. 26A-26B illustrate a correspondence between the distance of the input device 1 to each terminal and the arrangement of the depth direction on the screen display 31. As a result, it is possible to replace an active screen by operation in a depth direction, i.e. the z-axis direction of the input device 1.

Figure 27:
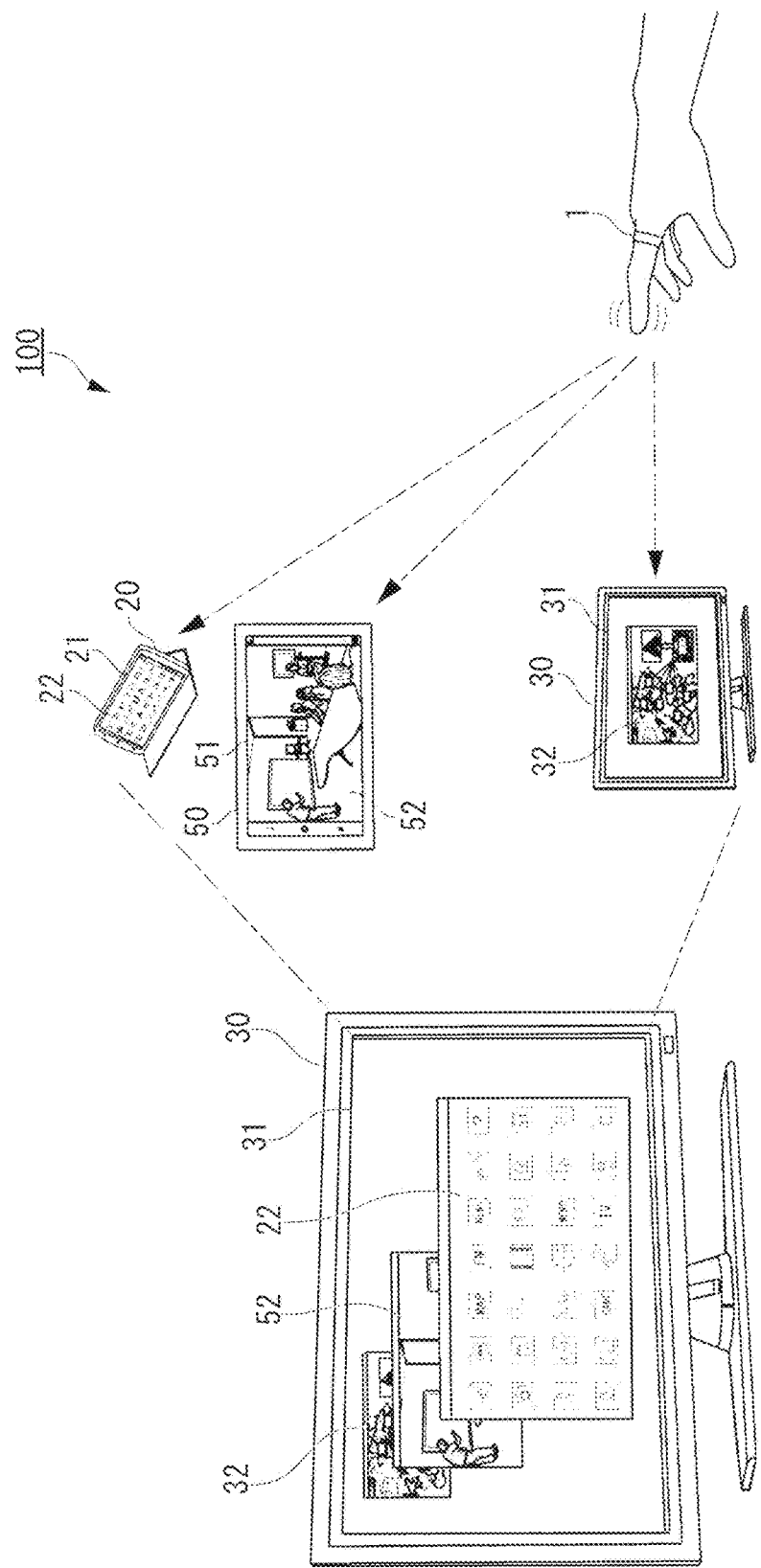
FIGS. 27-28 each illustrate a multiple terminal and user interface configuration according to one embodiment.

FIG. 27 illustrates a second embodiment of a multiple terminal and a user interface configuration. In FIG. 27, the horizontal distance of each terminal from the input device 1 is the same, although the total distance from the input device 1 differs for each terminal. The portable terminal 20, the tablet-type terminal 50, and the TV terminal 30 are all located in a straight line in which the depth direction, i.e. z-axis direction with respect to the input device 1 is substantially the same. Even though the portable terminal 20 is the most distant terminal from the input device 1, it is set as the control object terminal. As a result, the screen display 31 of the TV terminal 30 is displayed in the order of screen 22 of the portable terminal 20 in front view, screen 52 of the tablet-type terminal 50 in second view, and screen 32 of the TV terminal 30 in the most rear view.

When the tablet-type terminal 50 is operated more preferentially than the portable terminal 20, the screen display 31 of the TV terminal 30 can display screen 52 of the tablet-type terminal 50 in the front view ahead of screens 22 and 32 of the portable terminal 20 and the TV terminal 30, respectively.

Figure 28:
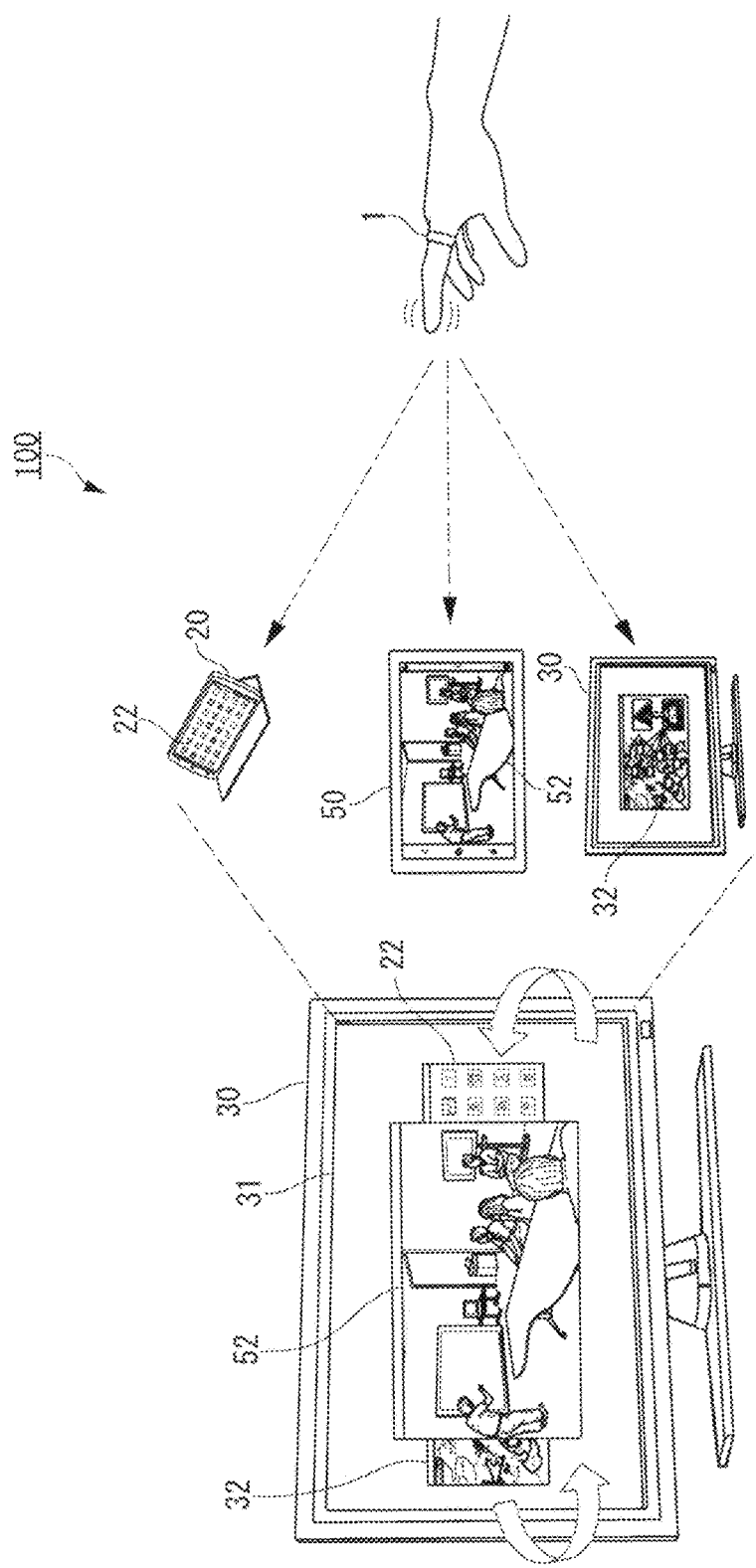

FIG. 28 illustrates a third embodiment of a multiple terminal and a user interface configuration 100. In FIG. 28, the distance between the input device 1 and each terminal is approximately the same. In this embodiment, the weighting of each terminal is equal, and therefore, there is no setting of one terminal as a preferred control object terminal. In FIG. 28, screen 52 of the tablet-type terminal 50 is displayed in the center of the screen display 31 of the TV terminal 30 as an active screen. Screen 22 of the portable terminal 20 and screen 32 of the TV terminal 30 are on the back side of screen 52 and are displayed on the right side and the left side, respectively of screen 52. Screens 52, 22, and 32 are rotated transversely according to an operation of a user with respect to the wearable input device 1, wherein the active screen interchanges accordingly. In one embodiment, the active screen can interchange by operation of a depth direction of the input device 1. In another embodiment, the active screen may interchange by operation of a horizontal direction, i.e. the x-axis direction.

Figure 29:
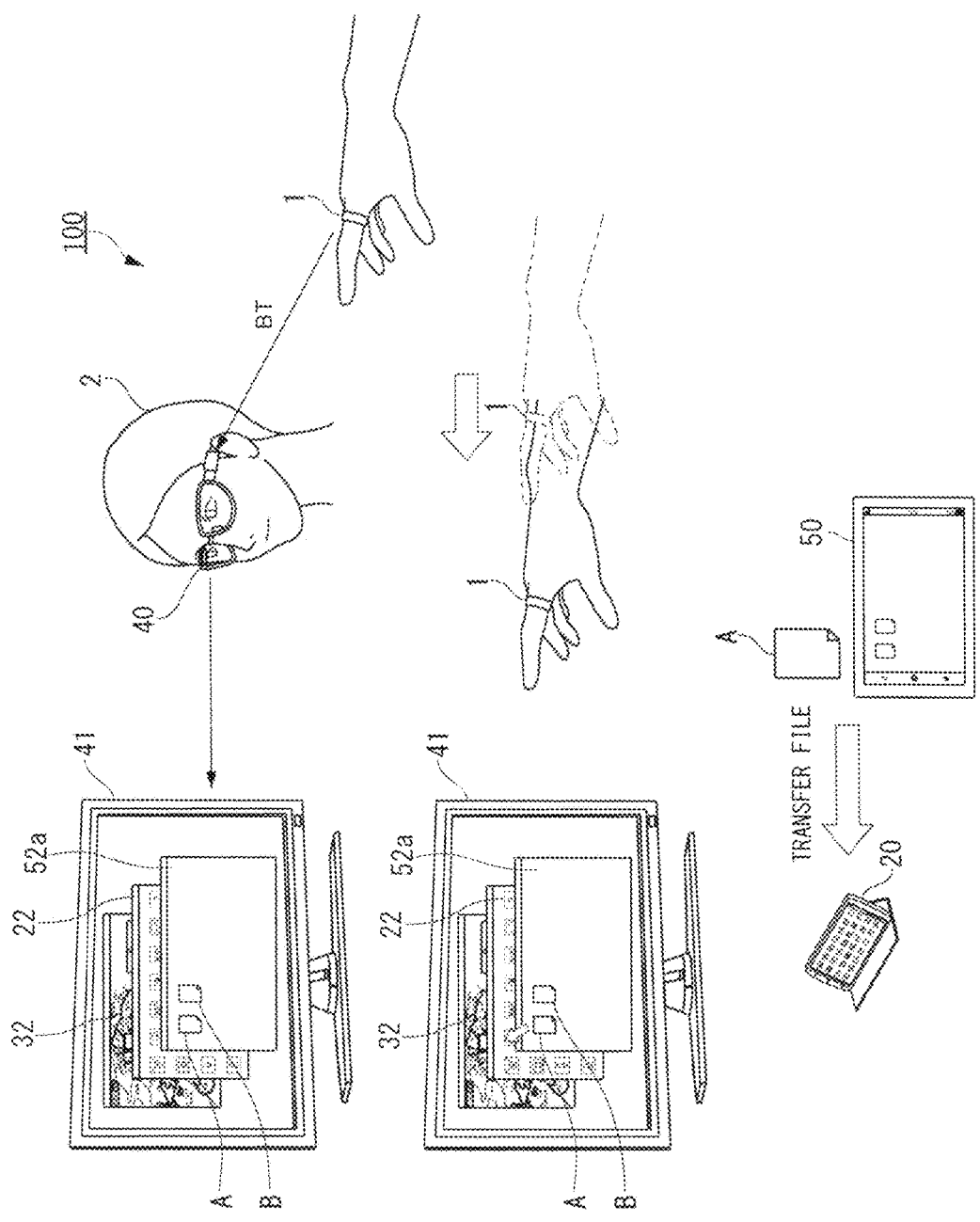
FIG. 29 illustrates transferring a file by utilizing a wearable input device according to one embodiment.

FIG. 29 illustrates transferring a file 100 by utilizing a wearable input device. A file is transferred between terminals with a drag function in the z-axis direction using the input device 1. The upper drawing of FIG. 29 illustrates a wearable input device 1 mounted on a finger to input and/or manipulate files A and B in the screen display 41 of glasses 40 using a Bluetooth function on glasses 40 of a user 2. Screen 52a of the tablet-type terminal 50, screen 22 of the portable terminal 20, and screen 32 of the TV terminal 30 are displayed on the screen display 41 of glasses 40. The middle drawing of FIG. 29 illustrates a user wearing the input device 1 and operating the input device 1 in a depth direction, i.e. z-axis direction to designate file A. By an upward dragging gesture of the input device 1, designated file A in screen 52a of the tablet-type terminal 50 is transferred to screen 22 of portable terminal 20 in the screen display 41 of glasses 40. The transfer of designated file A from the tablet-type terminal 50 to the portable terminal 20 is executed as shown in the lower drawing of FIG. 29. In addition to transferring a file, an operation to copy or delete a file can also be executed.

Figure 30:
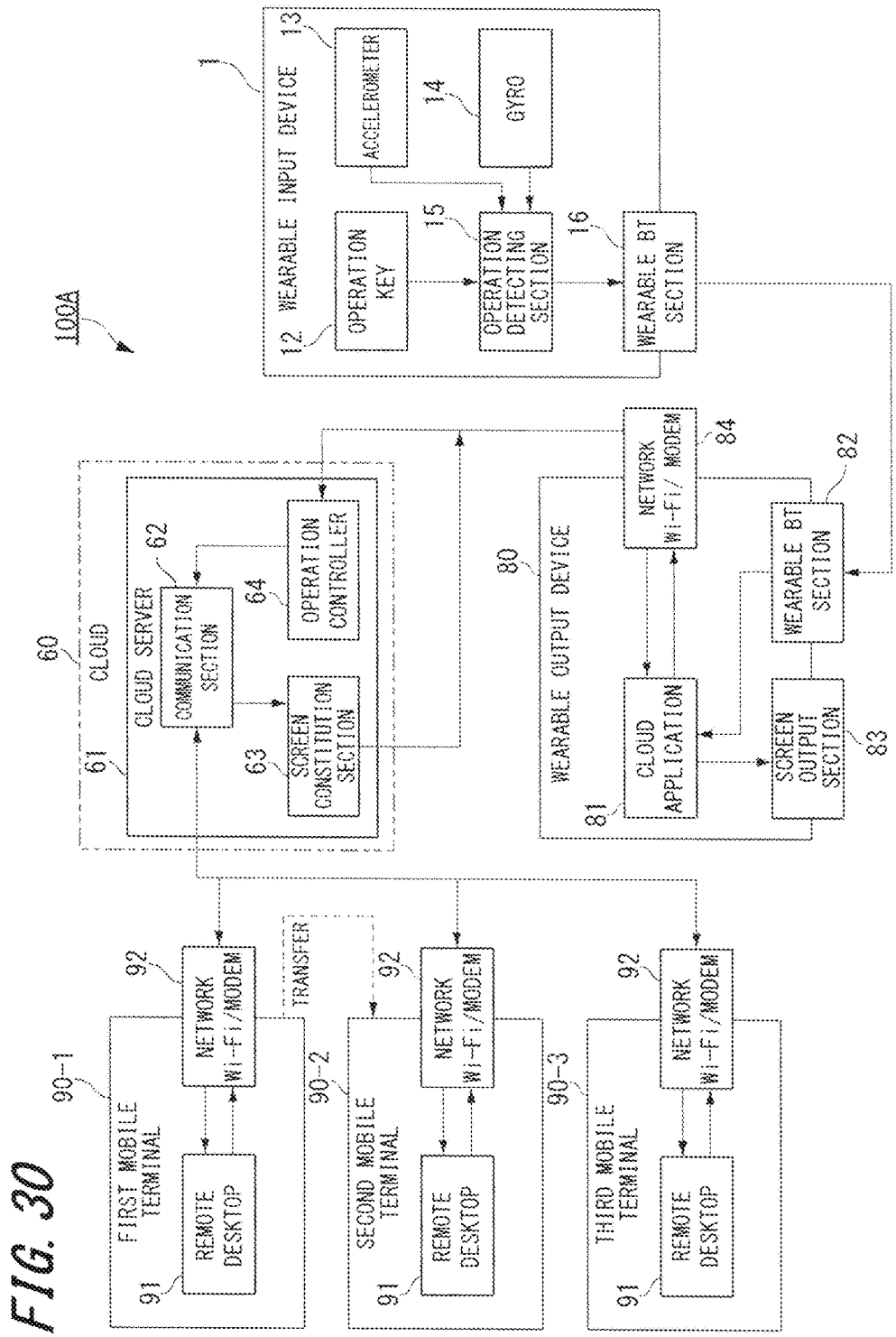
FIG. 30 is a block diagram of an exemplary input system for performing a file transfer via a cloud mechanism according to one embodiment.

FIG. 30 is a schematic structure of an exemplary input system for performing a file transfer via a cloud mechanism. Input system 100A includes a wearable input device 1, a wearable output device 80, a cloud structure 60, a first portable terminal 90-1, a second portable terminal 90-2, and a third portable terminal 90-3. Terminals 90-1 through 90-3 are examples of target terminal devices.

The wearable input device 1 includes an operation key 12, an accelerometer 13, a gyroscope 14, an operation detection mechanism 15, and a wearable Bluetooth mechanism 16.

Wearable output device 80 is an output device which can be mounted or attached to a user's body. One example of a wearable output device 80 is spectacles or glasses, a TV terminal, an interactive white board, etc. The wearable output device 80 includes a cloud application mechanism 81, a wearable Bluetooth mechanism 82, a screen output mechanism 83, and a network Wi-Fi/modem mechanism 84. The cloud application mechanism 81 includes one or more processors, such as a central processing unit to read and perform program code of software retrieved from a storage mechanism. The cloud application mechanism 81 controls each component of the wearable output device 80. Wearable Bluetooth mechanism 82 communicates with the wearable Bluetooth mechanism 16 of the wearable input device 1. The screen output mechanism 83 corresponds to the screen display 31 of the TV terminal 30 or the screen display 41 of glasses 40.

The screens of the first portable terminal 90-1 through the third portable terminal 90-3 are displayed via the cloud 60 through network Wi-Fi modems 92 to and from respective portable desktops 91. Network Wi-Fi/modem 84 transmits and receives to and from the cloud server 61 of the cloud 60 to the wearable output device 80. Network Wi-Fi/modem 84 also performs modulation and demodulation of the data to transmit and receive.

The cloud server 61 within the cloud 60 includes a communication mechanism 62, a screen structure mechanism 63, and an operation control mechanism 64. The communication mechanism 62 transmits and receives various data to and from the wearable output device 80 via Wi-Fi. The communication mechanism 62 also transmits and receives data with the first through third portable terminals 90-1 through 90-3 via Wi-Fi. The communication mechanism 62 corresponds to the Wi-Fi communication mechanism 79 of targets 70A and 70B of FIG. 10.

Screen structure mechanism 63 includes the screen output to the screen output mechanism 83 of the wearable output device 80. Screen structure mechanism 63 corresponds to the view manager 74 and the graphics mechanism 76 of targets 70A and 70B of FIG. 10. The operation control mechanism 64 analyzes the input event of the wearable input device 1 transmitted from the wearable output device 80 according to the analyzed result. The operation control mechanism 64 corresponds to the gesture drag analysis mechanism 72 and the input event transmission mechanism 73 of targets 70A and 70B of FIG. 10. The cloud server 61 manages operations control of each portable terminal and the screen structure. The wearable input device 1 and the wearable output device 80 perform input and output as a physical interface with respect to each portable terminal.

Figure 31:
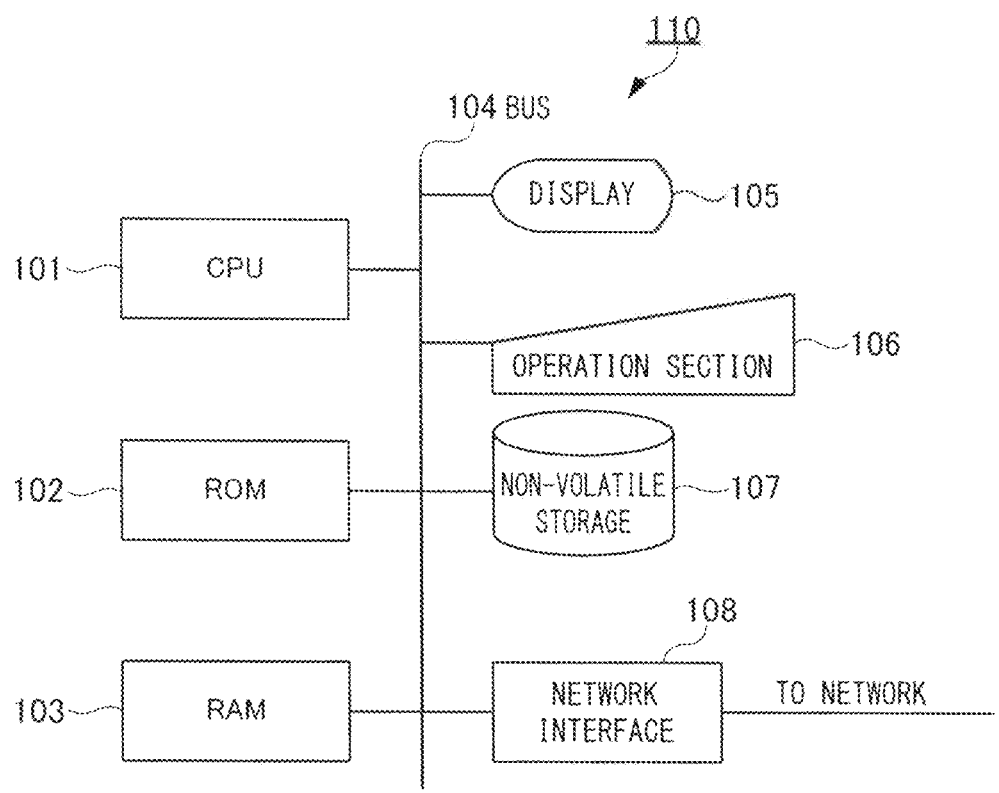
FIG. 31 is a block diagram of an exemplary computing system according to one embodiment.

FIG. 31 is a block diagram of an exemplary computing device used in conjunction with one or more of the cloud server 61, wearable input device 1, wearable output device 80, or the first through the third portable terminals, 90-1 through 90-3 illustrated in FIG. 30. Computer 110 includes central processing unit (CPU) 101, read-only memory (ROM) 102, and random-access memory (RAM) 103, which are interconnected via bus 104. Computer 110 also includes a display mechanism 105, an operation mechanism 106, a non-volatile storage mechanism 107, and a network interface mechanism 108. CPU 101 reads from ROM 102 program code of software to execute functions described herein. CPU 101 generates data packets or replaces the transmission order of a data packet to transmit. CPU 101 replaces the transmission order of the received data packet and restores the original data or relays a data packet. Processing apparatuses, such as a micro-processing unit can be used in place of CPU 101.

Arithmetic processing or variables received and transmitted are temporarily stored in RAM 103. RAM 103 is also used for various buffers in embodiments described herein.

A liquid crystal display monitor can be used for the display mechanism 105, and results of processing by computer 110 are displayed. A keyboard, mouse, or other peripherals can be used with the operation mechanism 106. The non-volatile storage mechanism 107 can be a hard disk drive (HDD). In the non-volatile storage mechanism 107, the program for computer functions other than an operating system can be recorded and stored in the non-volatile storage mechanism 107. A network interface card (NIC) can be used for the network interface mechanism 108, where various data is transmitted and received between networks in it through a local area network (LAN). The network interface mechanism 108 corresponds to the communication mechanism 62 of the cloud server of FIG. 30 to communicate with an external terminal. Although computer 110 illustrates a display mechanism 105 and an operation mechanism 106, an alternative embodiment does not include these features in the cloud server 61.

Portable terminals 90-1 through 90-3 can be equipped with the structure and function of computer 110. In an exemplary system, the first portable terminal 90-1 can be equipped with a remote desktop 91 and a network Wi-Fi/modem 92. The remote desktop 91 is configured to receive operations from another computer connected to the network. A graphical user interface (GUI) and the desktop environment of the first portable terminal 90-1 are configured to operate with instructions from the wearable input device 1 through the cloud server 61 and the wearable output device 80. Network Wi-Fi/modem 92 corresponds to network Wi-Fi/modem 84 of the cloud server 61. Network Wi-Fi/modem 92 transmits and receives data to and from the cloud server 61 of the cloud 60 via Wi-Fi. Network Wi-Fi/modem 92 performs modulation and demodulation of the transmitted and received data.

Figure 32:
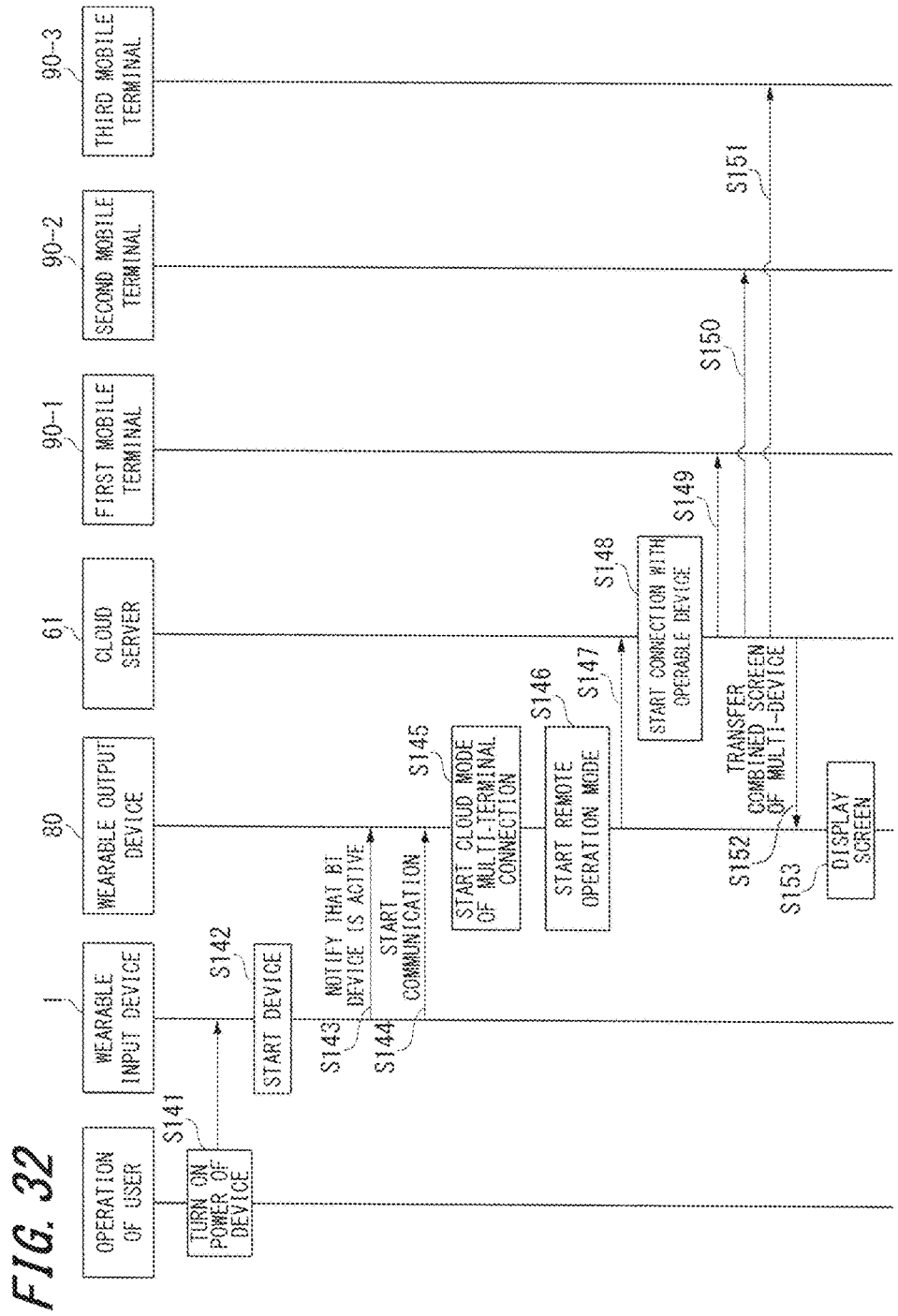
FIGS. 32-34 each illustrate a sequence of displaying a synthetic screen according to one embodiment.

FIG. 32 illustrates a sequence in which a synthetic screen of screen 32 of a TV home screen 32 and screen 22 of the portable terminal 20 are displayed on a TV screen display 31 of the TV terminal 30. The input system includes the wearable input device 1, the wearable output device 80, the cloud server 61, and the first through third portable terminals 90-1 through 90-3.

The user 2 presses down the power supply key 11 of the input device 1 in step S141. The operation detection mechanism 15 of the input device 1 detects that the power supply key 11 has been depressed and turns on a power supply in step S142. In step S143, wearable Bluetooth mechanism 16 of the wearable input device 1 sends notification to the wearable output device 80 that the wearable input device 1 is active as a Bluetooth device. Wearable Bluetooth mechanism 82 of the wearable output device 80 receives notification from the wearable input device 1 and searches for a peripheral Bluetooth device that might exist. The wearable input device 1 responds to the wearable Bluetooth mechanism 82 when a peripheral Bluetooth device exists. Wearable Bluetooth mechanism 82 of the wearable output device 80 established a connection based on the wearable input device 1 and Bluetooth when a response from the wearable input device 1 is detected.

In step S144, wearable Bluetooth mechanism 16 of the wearable input device 1 begins communication with the wearable Bluetooth mechanism 82 of the wearable output device 80. In step S145, the cloud application mechanism 81 of the wearable output device 80 begins a cloud mode of a multi-terminal connection. In step S146, the cloud application mechanism 81 of the wearable output device 80 begins a remote-control mode.

In step S147, the cloud application mechanism 81 of the wearable output device 80 notifies the cloud server 61 that remote-control mode has started through network Wi-Fi/modem 84. In step S148, the operation control mechanism 64 of the cloud server 61 receives notification of having started remote-control mode from the wearable output device 80. The communication mechanism 62 of the cloud server 61 begins a connection with the device which can be operated.

In steps S149, S150, and S151, the communication mechanism 62 of the cloud server 61 begins a connection process via Wi-Fi with each of the first through third portable terminals, 90-1 through 90-3. The first through third terminals connect with the cloud server 61, wherein each remote desktop 91 of the first through third portable terminals transmits image data corresponding to the screen of the remote desktop 91 to the cloud server 61 through network Wi-Fi/modem 92.

In step S152, the communication mechanism 62 of the cloud server 61 receives the image data corresponding to the screen of the remote desktop 91 from the first portable terminal 90-1 through the third portable terminal 90-3. The screen structure mechanism 63 of the cloud server 61 generates a synthetic screen based on the received image data. The image data corresponding to the synthetic screen is transferred to the wearable output device 80 through the communication mechanism 62.

In step S153, network Wi-Fi/modem 84 of the wearable output device 80 receives the image data corresponding to the synthetic screen of the first through the third portable terminals 90-1 through 90-3. The cloud application mechanism 81 outputs and displays the image data corresponding to the synthetic screen of the first through the third portable terminals 90-1 through 90-3 on the screen output mechanism 83. In this processing, the screen of each remote desktop 91 of the first through the third portable terminals is combined, and it displays on the screen output mechanism 83 of the wearable output device 80.

Figure 33:
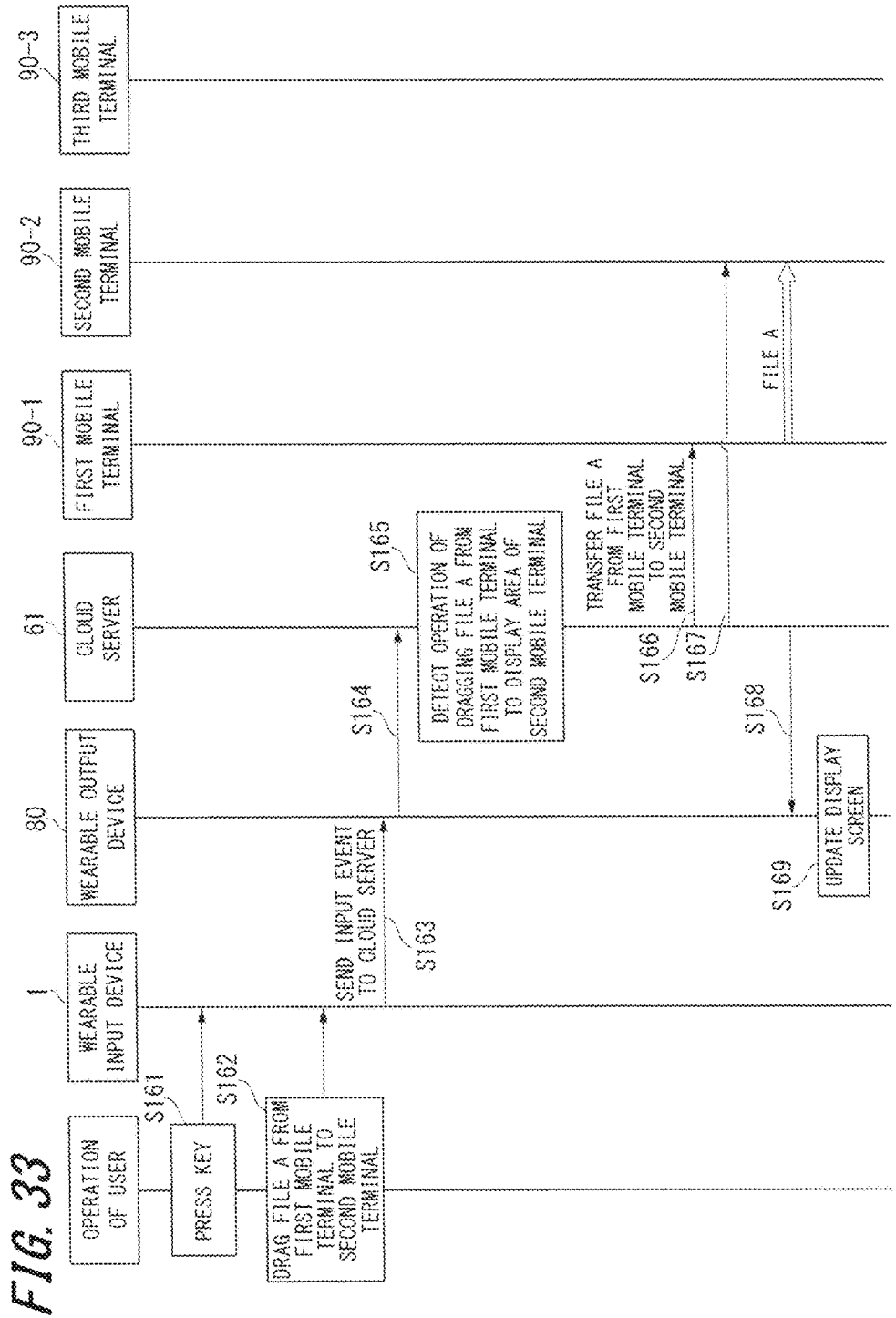

FIG. 33 illustrates a sequence of input operations when a synthetic screen of each screen for the first through the third portable terminals 90-1 through 90-3 is displayed to the wearable output device 80. In step S161, the user 2 presses down the power supply key 11 of the input device 1. In step S162, while the user 2 presses the operation key 12, file A is dragged to the second portable terminal 90-2 from the first portable terminal 90-1. In step S163, the operation detection mechanism 15 of the wearable input device 1 transmits an input event toward the cloud server 61 through wearable Bluetooth mechanism 16. In step S164, wearable Bluetooth mechanism 82 of the wearable output device 80 receives an input event from the wearable input device 1. The cloud application mechanism 81 of the wearable output device 80 transfers the received input event to the cloud server 61 through network Wi-Fi/modem 84.

In step S165, the communication mechanism 62 of the cloud server 61 receives an input event from the wearable output device 80. The operation control mechanism 64 analyzes the content of the input event. As a result of the analysis, the operation control mechanism 64 detects that it is an operation in which the input event dragged file A to the display area of the second portable terminal 90-2 from the display area of the first portable terminal 90-1. In step S166, the operation control mechanism 64 of the cloud server 61 sends notification that file A is transferred to the second portable terminal 90-2 with respect to the first portable terminal 90-1. In step S167, the operation control mechanism 64 of the cloud server 61 sends notification to the second portable terminal 90-2 that file A is transferred from the first portable terminal 90-1 to the second portable terminal 90-2. File A is transferred to the second portable terminal 90-2 from the first portable terminal 90-1 via the cloud server 61.

In step S168, the communication mechanism 62 of the cloud server 61 receives the image data corresponding to the screen of the remote desktop 91 after transferring file A from the first portable terminal 90-1 to the second portable terminal 90-2. The screen structure mechanism 63 of the cloud server 61 updates a synthetic screen based on the received image data. The image data corresponding to the updated synthetic screen is transferred to the wearable output device 80 through the communication mechanism 62.

In step S169, network Wi-Fi/modem 84 of the wearable output device 80 receives image data corresponding to the synthetic screen on which the first portable terminal through the third portable terminal was updated. The cloud application mechanism 81 outputs the image data corresponding to the synthetic screen output mechanism 83, and updates a display screen.

Input events, such as a file transfer were described as being transmitted to the first through the third portable terminals via the cloud 60. In other embodiments, an operation is not required to operate through the cloud 60. Instead, the wearable output device 80 and the first through the third portable terminals could perform immediate data communication without going through the cloud 60.

Figure 34:
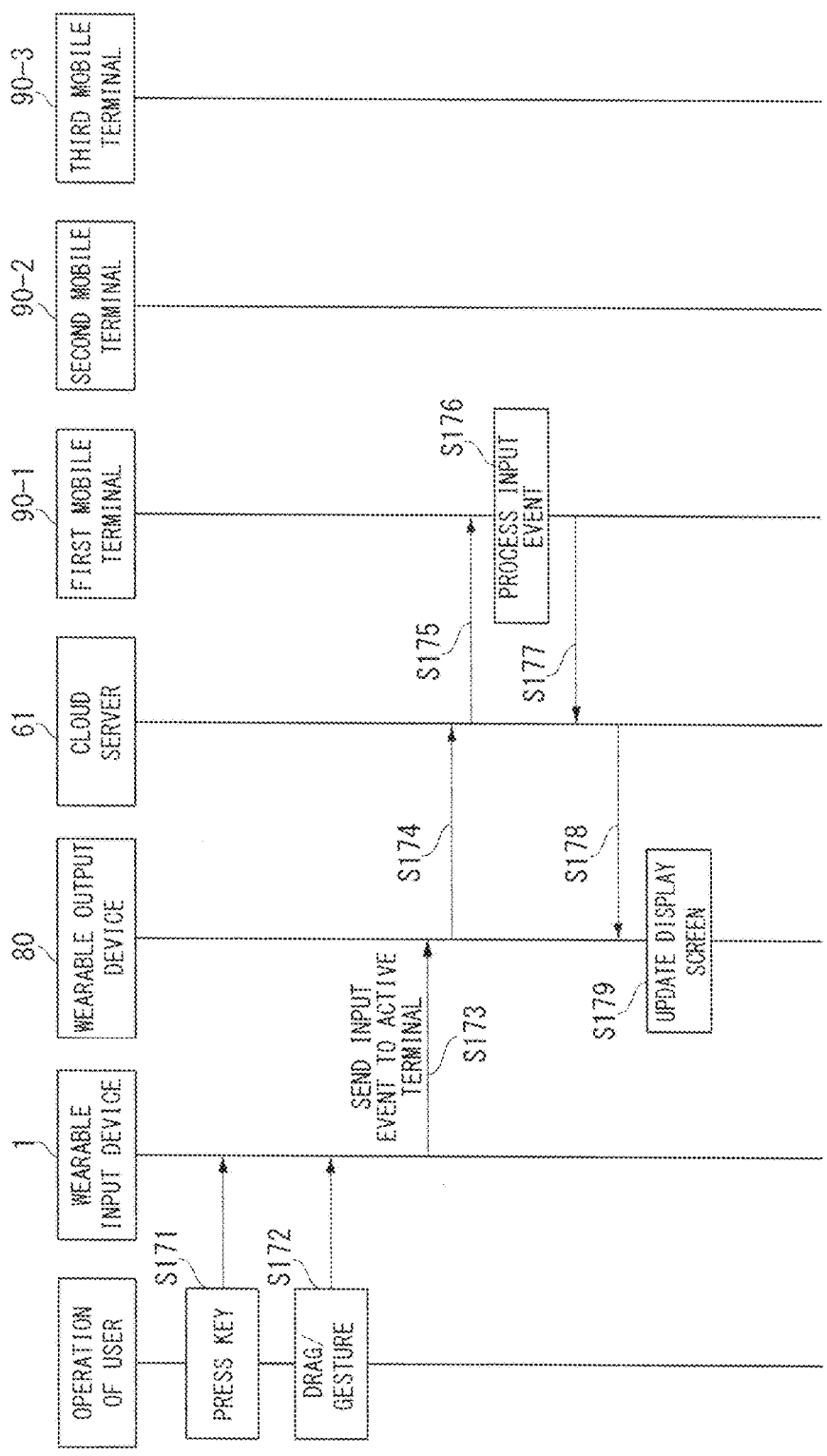

FIG. 34 illustrates a sequence of events, via remote control for a synthetic screen of each screen of the first through the third portable terminals, displayed to the wearable output device 80. In this example, the first portable terminal 90-1 is set to be the control object terminal. In step S171, the user 2 presses down the power supply key 11 of the input device 1. In step S172, the user 2 presses the operation key 12 of the input device and performs a drag or gesture operation.

In step S173, the operation detection mechanism 15 of the wearable input device 1 transmits an input event through wearable Bluetooth mechanism 16 towards the first portable terminal 90-1, which is the active control object terminal. In step S174, wearable Bluetooth mechanism 82 of the wearable output device 80 receives the input event from the wearable input device 1. The cloud application mechanism 81 of the wearable output device 80 transfers the received input event to the cloud server 61 through network Wi-Fi/modem 84. In step S175, the communication mechanism 62 of the cloud server 61, receives the input event from the wearable output device 80. The operation control mechanism 64 of the cloud server 61 transfers the received input event to the first portable terminal 90-1 through the communication mechanism 62.

In step S176, the first portable terminal 90-1 receives an input event through network Wi-Fi/modem 92. The remote desktop 91 of the first portable terminal 90-1 analyzes and processes the input event. In step S177, the remote desktop 91 of the first portable terminal 90-1 transmits the image data corresponding to the screen of the remote desktop 91 on which the input event was reflected to the cloud server 61 through network Wi-Fi/modem 92.

In step S178, the communication mechanism 62 of the cloud server 61 receives the image data corresponding to a screen from the first portable terminal 90-1. The operation control mechanism 64 of the cloud server 61 transfers the received image data to the wearable output device 80 through the communication mechanism 62. In step S179, network Wi-Fi/modem 84 of the wearable output device 80 receives the image data corresponding to the screen of the first portable terminal 90-1 in which the input event was reflected. The cloud application mechanism 81 outputs the image data corresponding to the synthetic screen of the first portable terminal 90-1 through the third portable terminal 90-3 to the screen output mechanism 83, and updates a display screen.

FIGS. 35A-35F illustrate an exemplary user interface display for different modes, such as a gesture mode and a drag mode in the form of an auxiliary guide. FIG. 35A illustrates left-right-up-down directional keys in screen 111 in a gesture mode. This provides the mechanism for a flicking gesture. FIG. 35B illustrates switching to a drag mode in screen 112. A circle is displayed with a broken line in a user interface to show a starting point. When a user moves a hand with a wearable input device in the state of screen 112, without pressing the operation key, the starting point shown with a broken line circle will move, as illustrated in screen 113 of FIG. 35C. If a user presses the operation key while in the state of screen 112, a down start will be displayed in the user interface.

In FIG. 35D in the state of screen 114, while the user has pressed the operation key of the input device, a drag will continue when the hand is moved, as illustrated in screen 115 of FIG. 35E. In the state of screen 115, when the user releases the operation key of the input device, the drag function will be ended with an upward operation. In FIG. 35F, the broken line circle is displayed on screen 116 to indicate the newly created up location.

The embodiments illustrated in FIGS. 35A-35F provide a mechanism for confirming a user interface display, where the user can recognize each specific event. By using embodiments described herein, multiple terminals can be controlled with 3-D input by a single input device.

Numerous modifications and variations of the present invention are possible in light of the above teachings. The embodiments described with reference to the drawings may be practiced individually or in any combination thereof. It is therefore to be understood that within the scope of the appended claims, the invention may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) A wearable electronic input device comprising circuitry configured to: detect an input event from acceleration data received in the wearable electronic input device; send operation content from the wearable electronic input device to a first portable electronic device according to the detected input event; designate a first screen of the first portable electronic device as a screen-to-be-controlled; and combine the first screen of the first portable electronic device onto a second screen of a second portable electronic device.

(2) The wearable electronic input device according to (1), wherein the wearable electronic input device comprises a ring configured to be worn on a finger of a user.

(3) The wearable electronic input device according to (1) or (2), wherein the wearable electronic input device comprises a portable hand-held device.

(4) The wearable electronic input device according to any one of (1) to (3), further comprising an operation control key configured to detect movement data and initiate an operation based upon the detected movement data.

(5) The wearable electronic input device according to any one of (1) to (4), further comprising an accelerometer configured to receive 3-dimensional linear movement.

(6) The wearable electronic input device according to any one of (1) to (5), further comprising a gyroscope configured to receive 3-dimensional rotational movement.

(7) The wearable electronic input device according to any one of (1) to (6), further comprising circuitry configured for Bluetooth communication to measure a distance between the wearable electronic input device and a plurality of portable electronic devices, and to designate a screen-to-be-controlled of one of the plurality of portable electronic devices based upon the distance.

(8) The wearable electronic input device according to any one of (1) to (7), wherein the circuitry is further configured to initiate user interfaces for the first screen and the second screen based upon the measured distance.

(9) The wearable electronic input device according to any one of (1) to (8), wherein the wearable electronic input device has circuitry configured to receive an input mode of a rolling gesture, via a gyroscope within the wearable electronic input device.

(10) The wearable electronic input device according to any one of (1) to (9), wherein the circuitry of the wearable electronic input device is controlled via a cloud structure.

(11) The wearable electronic input device according to any one of (1) to (10), wherein the wearable input device includes circuitry configured to detect a flicking gesture or a drag gesture input event.

(12) An electronic input system comprising: a wearable input device having an accelerometer and circuitry configured for an operation detection mechanism and an input communication mechanism, wherein the operation detection mechanism acquires acceleration data from the accelerometer to detect an input event; a first electronic device having circuitry for a first communication mechanism, a first event analyzer, a screen display, and a first data communication mechanism; and a second electronic device having circuitry configured for a second communication mechanism, a second event analyzer, a second data communication mechanism, a screen combining mechanism, and a screen display. The input communication mechanism, the first communication mechanism, and the second communication mechanism have circuitry configured to send notification of the input event of the wearable input device. The first event analyzer and the second event analyzer have circuitry configured to analyze the input event detected by the wearable input device. The first data communication mechanism and the second data communication mechanism have circuitry configured to send and receive screen data to and from one another. Circuitry of the wearable input device is configured to wirelessly send operation content from the wearable input device to a screen-to-be-controlled of the first electronic device or the second electronic device as a switching event, via a depth direction movement of the wearable input device. Circuitry of the screen combining mechanism is configured to combine a screen of the second electronic device with a screen obtained from screen data received from the first electronic device.

(13) The electronic input system according to (12), wherein the input communication mechanism, the first communication mechanism, and the second communication mechanism communicate via Bluetooth communication.

(14) The electronic input system according to (12) or (13), wherein the first data communication mechanism and the second data communication mechanism communicate via wireless fidelity (Wi-Fi) communication.

(15) The electronic input system according to any one of (12) to (14), wherein circuitry of the screen-to-be-controlled of the first electronic device or the second electronic device is configured to notify a current screen-to-be-controlled of a switch to a new screen-to-be-controlled.

(16) The electronic input system according to any one of (12) to (15), wherein the wearable input device has circuitry configured to measure a distance between the wearable input device and either of the first electronic device or the second electronic device located within a vicinity of a received Bluetooth signal.

(17) The electronic input system according to any one of (12) to (16), wherein user interfaces for screens of the first electronic device and the second electronic device are configured based upon the measured distance.

(18) The electronic input system according to any one of (12) to (17), wherein the wearable input device has circuitry configured to receive an input mode of a rolling gesture, via a gyroscope within the wearable input device.

(19) The electronic input system according to any one of (12) to (18), wherein the input event is detected via an operation key of the wearable input device.

(20) The electronic input system according to any one of (12) to (19), wherein the wearable input device is configured to obtain acceleration data and rotational data while the operation key is depressed during the input event.

(21) The electronic input system according to any one of (12) to (20), wherein the circuitry of the wearable input device, the first electronic device, and the second electronic device is controlled via a cloud structure.

(22) The electronic input system according to any one of (12) to (21), wherein the first electronic device and the second electronic device each include one of a portable electronic device, a TV electronic device, or a head-mounted electronic device.

(23) The electronic input system according to any one of (12) to (22), wherein the wearable input device includes circuitry configured to detect a flicking gesture or a drag gesture input event.

(24) A method of communicating an event between electronic portable devices, the method comprising: acquiring acceleration data of the event from an accelerometer of a wearable input device; communicating the event to a first electronic portable device having a first communication mechanism; analyzing the event via a first event analyzer of the first electronic portable device; sending screen data from a first data communication mechanism of the first electronic portable device to a second data communication mechanism of a second electronic portable device; and combining a screen of the first electronic portable device with a screen of the second electronic portable device onto a display of the second electronic portable device.

The invention claimed is:
1. A wearable electronic input device, comprising:
  circuitry configured to
    detect an input event from acceleration data received in the wearable electronic input device;
    send operation content from the wearable electronic input device to a first portable electronic device according to the detected input event;
    designate a first screen of the first portable electronic device as a screen-to-be-controlled; and
    combine the first screen of the first portable electronic device with a second screen of a second portable electronic device, select a combination of the first screen and the second screen, and transfer a file between the first and second portable electronic devices in accordance with a portion of the input event in a depth direction of the second screen, the file being selected in accordance with the portion of the input event in the depth direction of the second screen, wherein
  the circuitry is configured for Bluetooth communication to measure a distance between the wearable electronic input device and the first and second portable electronic devices, and to designate the first screen of the first portable electronic device to be the screen-to-be-controlled based upon the distance.

2. The wearable electronic input device of claim 1, wherein the wearable electronic input device comprises a ring configured to be worn on a finger of a user.

3. The wearable electronic input device of claim 1, wherein the wearable electronic input device comprises a portable hand-held device.

4. The wearable electronic input device of claim 1, further comprising:
an operation control key configured to detect movement data and initiate an operation based upon the detected movement data.

5. The wearable electronic input device of claim 1, further comprising:
an accelerometer configured to detect 3-dimensional linear movement.

6. The wearable electronic input device of claim 1, further comprising:
a gyroscope configured to detect 3-dimensional rotational movement.

7. The wearable electronic input device of claim 1, wherein the circuitry is further configured to initiate user interfaces for the first screen and the second screen based upon the measured distance.

8. The wearable electronic input device of claim 1, wherein the wearable electronic input device includes circuitry configured to detect an input mode of a rolling gesture via a gyroscope within the wearable electronic input device.

9. The wearable electronic input device of claim 1, wherein the circuitry of the wearable electronic input device is controlled via a cloud structure.

10. The wearable electronic input device of claim 1, wherein the wearable input device includes circuitry configured to detect a flicking gesture or a drag gesture input event.

11. An electronic device, comprising:
circuitry configured to
measure a distance between the electronic device and a plurality of portable electronic devices based on short-range wireless communication performed between the electronic device and the plurality of portable electronic devices;
designate a first screen of one of the plurality of portable electronic devices as a screen-to-be-controlled based on the measured distance;
detect an input event based on acceleration data detected at the electronic device;
send operation content from the electronic device to the one of the plurality of portable electronic devices according to the detected input event, wherein
the first screen of the one of the plurality of portable electronic device is combined with a second screen of a second one of the plurality of portable electronic devices, a combination of the first screen and the second screen is selected, and a file is transferred between the first and second portable electronic devices in accordance with a portion of the input event in a depth direction of the second screen, the file being selected in accordance with the portion of the input event in the depth direction of the second screen.

12. The electronic device of claim 11, wherein the electronic device is a wearable electronic device.

13. The electronic device of claim 11, wherein the electronic device is a ring configured to be worn on a finger of a user.

14. The electronic device of claim 11, wherein the electronic device is a portable hand-held device.

15. The electronic device of claim 11, further comprising:
a user interface configured to detect movement data and initiate an operation based upon the detected movement data.

16. The electronic device of claim 11, further comprising:
an accelerometer configured to detect 3-dimensional linear movement.

17. The electronic device of claim 11 further comprising:
a gyroscope configured to detect 3-dimensional rotational movement.

18. The electronic device of claim 11, wherein the circuitry is configured to initiate user interfaces for the first screen and the second screen based upon the measured distance.

19. The electronic device of claim 11, wherein the electronic device includes circuitry configured to detect a rolling gesture via a gyroscope within the electronic device.

20. The electronic device of claim 11, wherein the circuitry is controlled via a cloud structure.

21. The electronic device of claim 11, wherein the circuitry is configured to detect a flicking gesture or a drag gesture input event.

22. The electronic device of claim 11, wherein the circuitry is configured to:
control the combined first and second screens to be displayed by another electronic device in an overlapping manner in order based on the measured distance.

23. An electronic device, comprising:
circuitry configured to
determine a distance between the electronic device and a plurality of portable electronic devices based on Bluetooth communication performed between the electronic device and the plurality of portable electronic devices;
designate a first screen of one of the plurality of portable electronic devices as a screen-to-be-controlled based on the determined distance;
detect an input event at the electronic device;
send operation content from the electronic device to the one of the plurality of portable electronic devices according to the detected input event, wherein
the first screen of the one of the plurality of portable electronic device is combined with a second screen of a second one of the plurality of portable electronic devices, a combination of the first screen and the second screen is selected, and a file is transferred between the first and second portable electronic devices in accordance with a portion of the input event in a depth direction of the second screen, the file being selected in accordance with the portion of the input event in the depth direction of the second screen.

* * * * *